US008626234B2

(12) United States Patent
Miller

(10) Patent No.: US 8,626,234 B2
(45) Date of Patent: Jan. 7, 2014

(54) METHOD AND APPARATUS FOR PROVIDING LAYERED WIRELESS NETWORKS

(75) Inventor: Rosemarie B. Miller, Chester, NJ (US)

(73) Assignee: Alcatel Lucent, Paris (FR)

( * ) Notice: Subject to any disclaimer, the term of this patent is extended or adjusted under 35 U.S.C. 154(b) by 577 days.

(21) Appl. No.: 12/640,117

(22) Filed: Dec. 17, 2009

(65) Prior Publication Data
US 2011/0151924 A1  Jun. 23, 2011

(51) Int. Cl.
*H04M 1/00* (2006.01)

(52) U.S. Cl.
USPC ............... 455/552.1; 455/41.2; 455/426.1; 455/423; 379/106.02

(58) Field of Classification Search
USPC ............ 455/552.1, 435.1, 414.1, 41.2, 423, 455/426.1; 709/217, 224, 225; 379/106.02
See application file for complete search history.

(56) References Cited

U.S. PATENT DOCUMENTS

| | | | |
|---|---|---|---|
| 7,228,141 B2 * | 6/2007 | Sethi | 455/456.3 |
| 7,802,292 B2 * | 9/2010 | Shaw | 726/4 |
| 2002/0039892 A1 * | 4/2002 | Lindell | 455/151.1 |
| 2003/0074443 A1 | 4/2003 | Melaku et al. | |
| 2003/0190023 A1 * | 10/2003 | Farkas et al. | 379/106.02 |
| 2004/0192301 A1 * | 9/2004 | Shi | 455/435.1 |
| 2004/0199056 A1 * | 10/2004 | Husemann et al. | 600/300 |
| 2004/0260750 A1 * | 12/2004 | Ruutu et al. | 709/200 |
| 2006/0159074 A1 * | 7/2006 | Diebold et al. | 370/352 |
| 2007/0130657 A1 * | 6/2007 | Rogers et al. | D24/107 |
| 2007/0135866 A1 * | 6/2007 | Baker et al. | 607/60 |
| 2007/0217349 A1 * | 9/2007 | Fodor et al. | 370/310.2 |
| 2007/0255797 A1 | 11/2007 | Dunn et al. | |
| 2008/0102749 A1 * | 5/2008 | Becker | 455/3.06 |
| 2008/0102771 A1 * | 5/2008 | Joshi et al. | 455/187.1 |
| 2008/0176552 A1 * | 7/2008 | Hamano et al. | 455/422.1 |
| 2008/0311909 A1 * | 12/2008 | Taaghol et al. | 455/436 |
| 2009/0011783 A1 * | 1/2009 | Kitazoe | 455/517 |
| 2009/0061853 A1 * | 3/2009 | Anschutz | 455/432.1 |
| 2009/0176504 A1 * | 7/2009 | Poveda | 455/456.1 |
| 2009/0213731 A1 * | 8/2009 | Bhasin et al. | 370/230 |

(Continued)

FOREIGN PATENT DOCUMENTS

GB  2 398 705 B  8/2005
WO  WO 2005/062652 A1  7/2005

OTHER PUBLICATIONS

International Search Report and the Written Opinion of the International Searching Authority, or the Declaration, mailed Mar. 16, 2011 in PCT/US2010/057556, Alcatel-Lucent USA Inc., Applicant; 11 pages.

*Primary Examiner* — Kamran Afshar
*Assistant Examiner* — Mong-Thuy Tran
(74) *Attorney, Agent, or Firm* — Wall & Tong, LLP

(57) ABSTRACT

A capability is provided for supporting a layered wireless network. A method for supporting a service session for a wireless user device includes receiving a service request associated with the wireless user device, determining at least one characteristic of the service request, and selecting, using the at least one characteristic of the service request, one of a plurality of network layers available for supporting a service session for the service request. A network layer has a wireless access technology associated therewith and, optionally, also may have a core network technology associated therewith. The selection of the network layer for a service request may be performed within the network or performed at the wireless user device under the control of the network.

20 Claims, 10 Drawing Sheets

(56) References Cited

U.S. PATENT DOCUMENTS

| | | |
|---|---|---|
| 2010/0048205 A1* | 2/2010 | Guilford et al. ............ 455/432.1 |
| 2010/0099393 A1* | 4/2010 | Brisebois et al. ............. 455/418 |
| 2010/0120417 A1* | 5/2010 | Walker et al. ............... 455/426.1 |
| 2010/0150107 A1* | 6/2010 | Aghvami et al. ............. 370/331 |
| 2010/0167724 A1* | 7/2010 | Haran et al. ................ 455/432.3 |

* cited by examiner

METHOD AND APPARATUS FOR PROVIDING LAYERED WIRELESS NETWORKS

FIELD OF THE INVENTION

The invention relates generally to wireless networks, more specifically but not exclusively, to providing layered wireless networks.

BACKGROUND

As wireless networks continue to evolve to "anything to anything" networks that support "anything to anything" traffic, wireless networks need to be able to transport many different types of traffic both efficiently and cost effectively. For example, such wireless networks need to be able to transport traffic ranging from high end data traffic (e.g., streaming video services, video conferencing/collaboration services, peer-to-peer services, and the like) to low end data traffic for machine-to-machine (M2M) communication (e.g., healthcare monitoring, meter reading, and the like), and everything in between. Disadvantageously, however, existing wireless networks are "one size fits all" networks that do not support efficient and cost-effective use of network resources for transporting such traffic and, thus, the cost of providing all services, and the treatment of all services irrespective of the type of service, is the same. As such, the cost of providing services with lower data requirements is relatively high compared to the cost of providing services with high data requirements. In addition, low data requirement services, if in large enough volume, can overload a network intended to provide high data service, and, thus, compromise quality of service for services with high data requirements.

Furthermore, as wireless networks evolve to "anything to anything" type networks, many different traffic bottlenecks occur, thereby reducing the quality of service. First, in an "anything to anything" network, the amount of signaling that is performed in support of the "anything to anything" traffic continues to increase. The signaling overhead is significant, which uses resources in the network at a much higher rate than other types of traffic. This problem is further exacerbated as the numbers and types of services made available via the network increase, because spectrum becomes even more of a bottleneck. Second, in an "anything to anything" network, the amount of traffic through the core of the network is also greatly increased and bottlenecks in the core network will occur, especially with data intensive services, blocking the flow of traffic and greatly reducing quality of service. This has already been experienced with the iPhone, which is a 3G service, and 4G promises even higher increases in data traffic. As a result, service traffic (e.g., such as high speed, high bandwidth traffic supporting high value services) would need to be throttled back in order to free up capacity to support the associated signaling overhead or core network resources for these and other lower value services.

Additionally, while the foregoing problems are applicable to all types of wireless networks, these problems may be further exacerbated by other problems specific to different types of wireless networks. For example, traffic for M2M communication is short and bursty in nature, and does not require high bandwidth or great use of network resources. As a result, this type of traffic could be bundled together for more efficient network utilization. However, M2M networks are currently fragmented (primarily because M2M networks are operated by individual businesses for their own purposes) such that bundling of M2M traffic is not performed for a variety of reasons. First, most M2M networks are independent of service provider wireless networks, such that M2M traffic must be transported through one type of network independent of which type of network is capable of transporting the M2M traffic most efficiently (i.e., depending on the type of wireless technology being used by the service provider, such as CDMA, UMTS, LTE, and the like). Second, even lower-cost M2M networks, such as Zigbee, are not incorporated into or even interfaced with service provider wireless networks. Thus, since bundling of M2M traffic is not performed, the cost of transporting M2M traffic is greater than is necessary. Furthermore, as M2M traffic expands with increased "anything to anything" usage, the need for more robust and more efficient ways to carry M2M traffic will occur.

As such, a need exists for an improved capability for bundling and handling traffic in wireless networks.

SUMMARY

Various deficiencies in the prior art are addressed by embodiments that provide a layered wireless network capability. In one embodiment, a method for supporting a service session for a wireless user device includes receiving a service request associated with the wireless user device, determining at least one characteristic of the service request, and selecting, using the at least one characteristic of the service request, one of a plurality of network layers available for supporting a service session for the service request. A network layer has a wireless access technology associated therewith and, optionally, also may have a core network technology associated therewith. The selection of the network layer for a service request may be performed within the network or performed at the wireless user device under the control of the network.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
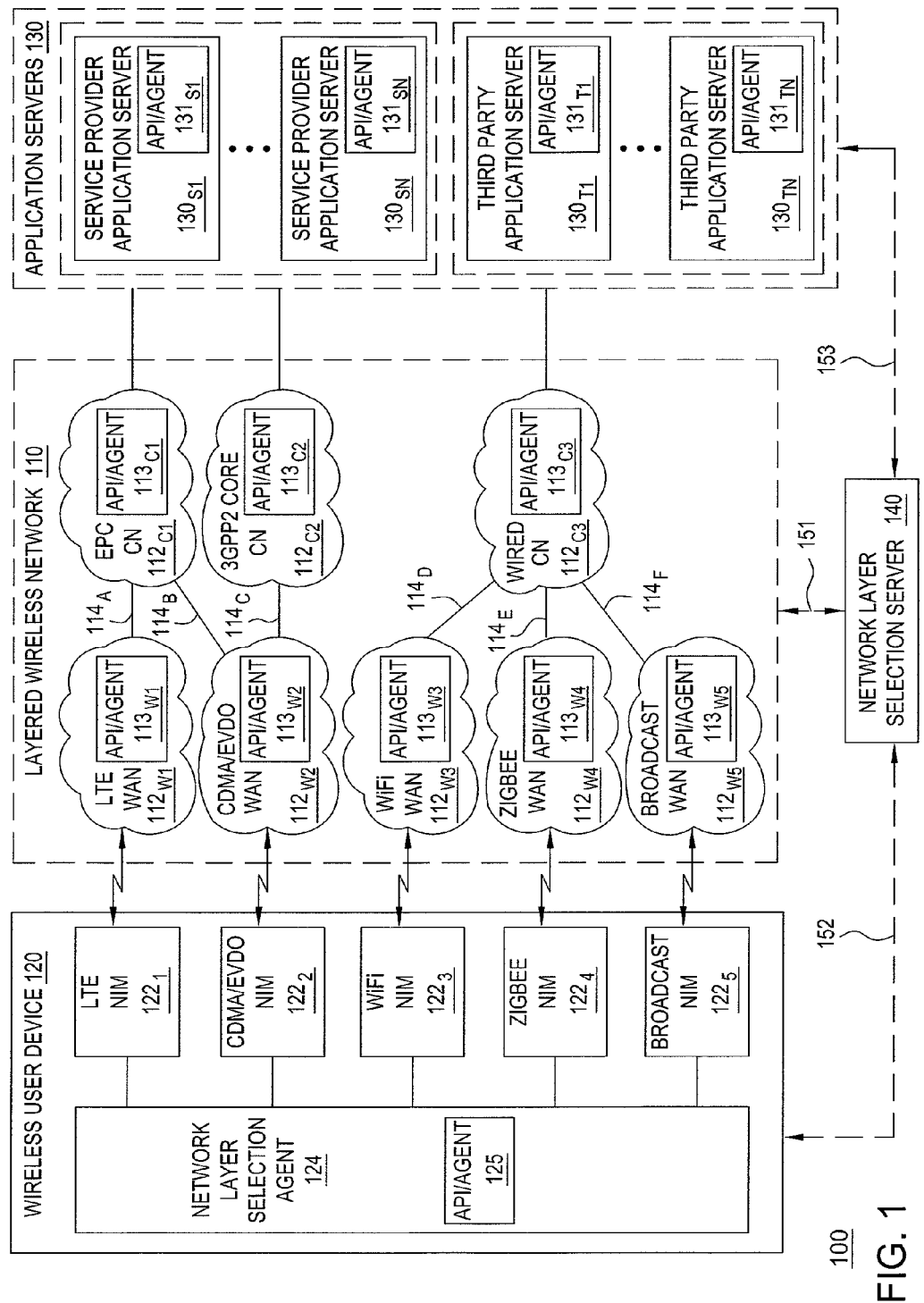
FIG. 1 depicts an exemplary communication system including a layered wireless network.

A layered wireless network capability is depicted and described herein. The layered wireless network capability supports layering of a service provider network using a plurality of network layers to form thereby a layered wireless network. The layered wireless network capability supports provider-controlled selection of network layers to be used for supporting service sessions for end users. The network layers of a layered wireless network may be defined in any suitable manner, including embodiments in which each network layer of the layered wireless network is defined as a combination of a wireless access technology and a core network technology, as well as embodiments in which one or more network layers of the layered wireless network may be defined in one or more other ways. The network layers of the layered wireless network are composed of networks which facilitate the service sessions, including wireless access networks and associated core networks that support the wireless access networks.

The layered wireless network capability is provided using a network layer selection server configured for performing functions such as receiving service requests, selecting network layers for supporting service sessions in response to the service requests (e.g., where selection of network layers for supporting the service sessions is based on one or more characteristics of the service requests and network layer selection information), initiating signaling for enabling establishment of the service sessions for the service requests, initiating signaling for reconfiguring service sessions in response to changes in network layer selection information and/or in response to trigger conditions, and the like, as well as combinations thereof. The network layer selection server performs network layer selection using network layer selection information. The network layer selection information may be maintained as network layer selection policies configured for use in selecting network layers for service sessions in response to service requests. The network layer selection policies maintained at the network layer selection server may be determined using one or more of the following types of network layer selection information: network status information received from networks of which the network layers are composed, user preference information associated with users for which service sessions are requested, application preference information associated with applications for which service sessions are requested, and the like, as described herein. It will be appreciated that the foregoing is merely a general description of certain aspects of the layered wireless network capability and, thus, the embodiments of the layered wireless network capability are not intended to be limited based on this general description.

The layered wireless network capability enables a service provider to balance traffic across multiple network layers based on one or more of the type of traffic (e.g., where traffic of certain applications is better suited for being transported and/or is more efficiently transported via certain types of wireless access network technologies and/or core network technologies), the status of the underlying networks of which the network layers are composed (e.g., status of the wireless access networks and/or core networks), and the like, as well as combinations thereof. This provides the service provider with significant control over which service provider networks transport which types of traffic, thereby enabling service providers to use the wireless and core networks more efficiently and, thus, provide better quality of service to end users while at the same time reducing costs.

The foregoing description of features of the layered wireless network capability is provided for purposes of introducing the layered wireless network capability and, therefore, the embodiments of the layered wireless network capability are not intended to be limited based on the foregoing description of features of the layered wireless network capability.

Although primarily depicted and described herein with respect to use of wireless access networks to form the network layers, it will be appreciated that one or more of the network layers of the layered wireless network may include wireline access networks and, thus, that the layered wireless network also may be referred to more generally herein as a layered network and, similarly, that the layered wireless network capability also may be referred to more generally herein as a layered network capability.

FIG. 1 depicts an exemplary communication system including a layered wireless network.

As depicted in FIG. 1, exemplary communication system (CS) 100 includes a layered wireless network (LWN) 110 including a plurality of networks 112 (which, illustratively, include a plurality of wireless access networks (WANs) $112_W$ and a plurality of core networks (CNs) $112_C$, which provide a plurality of network layers (NLs)), a wireless user device (WUD) 120, a plurality of application servers (ASs) 130 (which, illustratively, include a plurality of service provider ASs $130_S$ and a plurality of third-party ASs $130_T$) and a network layer selection server (NLSS) 140.

The networks 112 include a plurality of WANs $112_W$, including a Long Term Evolution (LTE) WAN $112_{W1}$, a Code Division Multiple Access (CDMA)/Evolution-Data Optimized (EVDO) WAN $112_{W2}$, a Wireless Fidelity (WiFi) WAN $112_{W3}$, a Zigbee WAN $112_{W4}$, and a Broadcast WAN $112_{W5}$ (e.g., a Digital Video Broadcasting-Handheld (DVB-H) network, a Digital Video Broadcasting-Satellite Services to Handhelds (DVB-SH) network, a MediaFLO network, and the like). Although primarily depicted and described with respect to specific WANs $112_W$, it will be appreciated that fewer or more WANs $112_W$ may be used to form LWN 110 and, similarly, different types of WANs $112_W$ may be used to form LWN 110. For example, a service provider may use a 4G wireless access technology other than LTE in place of the LTE WAN $112_{W1}$ or in addition to the LTE WAN $112_{W1}$. For example, a service provider may use a 3G wireless access technology other than CDMA/EVDO in place of CDMA/EVDO WAN $112_{W2}$ or in addition to CDMA/EVDO WAN $112_{W2}$ (e.g., using one or more of a Universal Mobile Telecommunication System (UMTS) based WAN, an Enhanced Data rates for GSM Evolution (EDGE) based WAN, and the like). Thus, it will be appreciated that the WANs $112_W$ depicted and described herein are merely exemplary, for purposes of describing the layered wireless network capability, and that any suitable numbers and types of radio access technologies may be used to provide a layered wireless network.

The networks 112 include a plurality of CNs $112_C$, including an Evolved Packet Core (EPC) CN $112_{C1}$, a Third Generation Partnership Project 2 (3GPP2) Core CN $112_{C2}$, and a Wired Core CN $112_{C3}$. Although primarily depicted and described with respect to specific CNs $112_C$, it will be appreciated that fewer or more CNs $112_C$ may be used to form LWN 110 and, similarly, different types of CNs $112_C$ may be used to form LWN 110. For example, a service provider may use a 4G core technology other than EPC in place of EPC CN $112_{C1}$ or in addition to EPC CN $112_{C1}$. For example, a service provider may use a 3G core technology other than 3GPP2 Core in place of 3GPP2 Core CN $112_{C2}$ or in addition to 3GPP2 Core CN $112_{C2}$. For example, the Wired Core CN $112_{C3}$ may be any wired network suitable for supporting wired communications for WANs $112_W$ such as WiFi WAN $112_{W3}$, Zigbee WAN $112_{W4}$, Broadcast WAN $112_{W5}$, and the like, as well as combinations thereof. As such, it will be appreciated that the CNs $112_C$ depicted and described herein are merely exemplary, for purposes of describing the layered wireless network capability, and that any suitable numbers and types of core network technologies may be used to provide a layered wireless network.

In one embodiment, each of the networks 112 includes one or more network APIs/agents 113 deployed therein. As depicted in FIG. 1, WANs $112_{W1}$-$112_{W5}$ include a plurality of WAN APIs/agents $113_{W1}$-$113_{W5}$ (collectively, WAN APIs/agents $113_W$) and CNs $112_{C1}$-$112_{C5}$ include a plurality of CN APIs/agents $113_{C1}$-$113_{C3}$ (collectively, CN APIs/agents $113_C$). The WAN APIs/agents $113_W$ and CN APIs/agents $113_C$ may be referred to collectively herein as network APIs/agents 113.

In this embodiment, network APIs/agents 113 may be deployed within networks 112, respectively, in any suitable manner, e.g., using any suitable network elements within networks 112. For example, the network API/agent $113_{W1}$ associated with LTE WAN $112_{W1}$ may be deployed on one or more of the eNodeBs or other network elements of the LTE WAN $112_{W1}$. For example, network API/agent $113_{W2}$ associated with CDMA/EVDO WAN $112_{W2}$ may be deployed on one or more of the base stations (BSs), base station routers (BSRs), base station controller (BSCs), and/or other network elements of the CDMA/EVDO WAN $112_{W2}$. For example, the network API/agent $113_{C1}$ associated with EPC CN $112_{C1}$ may be deployed on one or more of the PDN Gateway (PGW), the Serving Gateway (SGW), the Mobility Management Entity (MME), and the like, as well as combinations thereof. It will be appreciated that one skilled in the art would understand deployment options for deployment of network APIs/agents 113 within other networks 112 for which specific deployment examples are not provided.

In this embodiment, the network APIs/agents 113 may provide various functions for networks 112 in support of the layered wireless network capability.

The network APIs/agents 113 may facilitate communications between networks 112 and NLSS 140. For example, the networks APIs/agents 113 may facilitate communications between networks 112 and NLSS 140 for one or more of providing network state information to NLSS 140 for use by NLSS 140 in selecting NLs for service sessions, for receiving network configuration information from NLSS 140 and distributing network configuration information within the networks 112 (e.g., for use in configuring network elements of the networks 112 to support service sessions based on selection of NLs for the service sessions), and the like, as well as combinations thereof.

The network APIs/agents 113 may facilitate communications between networks 112. For example, the networks APIs/agent 113 of networks 112 may facilitate communications between networks 112 for reconfiguring service sessions in response to instructions from NLSS 140 (e.g., where an existing service session is moved from one NL to another NL, where an existing service session is supplemented with a new service session, and the like, as well as combinations thereof). The network APIs/agents 113 may facilitate communications between networks 112 for any other suitable purposes.

The network APIs/agents 113 also may be configured for facilitating adaptation of services to the NL being used for the services (e.g., to provide content adaptation according to the NL being used for the service session or performing other similar adaptations which may depend on the type of service being provided). This may be used in addition to or in place of service adaptation provided by the applications, such as where an application does not support such service adaptation.

The network APIs/agents 113 may provide other functions for networks 112 in support of the layered wireless network capability.

Although depicted and described with respect to an embodiment in which each network 112 includes one or more network APIs/agents 113, it will be appreciated that in other embodiments only a subset of the networks 112 will include associated network APIs/agents 113.

The WANs $112_W$ and CNs $112_C$ are interconnected using a plurality of network communication paths (NCPs) $114_A$-$114_F$ (collectively, NCPs 114). As depicted in FIG. 1, NCPs 114 include a NCP $114_A$ between LTE WAN $112_{W1}$ and EPC CN $112_{C1}$, a NCP $114_B$ between CDMA/EVDO WAN $112_{W2}$ and EPC CN $112_{C1}$, a NCP $114_C$ between CDMA/EVDO WAN $112_{W2}$ and 3GPP2 Core CN $112_{C2}$, a NCP $114_D$ between WiFi WAN $112_{W3}$ and Wired Core CN $112_{C3}$, a NCP $114_E$ between Zigbee WAN $112_{W4}$ and Wired Core CN $112_{C3}$, and a NCP 114 between Broadcast WAN $112_{W5}$ and Wired Core CN $112_{C3}$.

The LWN 110 provides a set of network layers (NLs) available for selection to support service sessions for WUD 120. As depicted in FIG. 1, although LWN 110 includes only five WANs $112_W$, LWN 110 actually supports six NLs, as indicated by the six NCPs (illustratively, NCPs 114) which may be used to support service sessions. Although LWN 110 is primarily depicted and described herein with respect to specific numbers of WANs and CNs supporting specific numbers of NLs, LWN 110 is not limited to any particular number of WANs, CNs, or NLs. The LWN 110 may include any number of WANs and any number of CNs, which may be connected in any number of ways, and, thus, LWN 110 may include any number of NLs. The layered wireless network capability is not limited to any particular numbers NLs, any particular WAN technologies, any particular CN technologies, and the like.

The NLSS 140 controls selection of NLs for service sessions based, at least in part, on network layer selection information available to NLSS 140. The operation of NLSS 140 in selecting NLs to support service sessions for WUD 120 may be better understood by first considering the capabilities of WUD 120.

The WUD 120 may be any wireless user device, such as a computer, a Mobile Internet Device (MID), a personal digital assistant (PDA), a data card, a smartphone, a phone, a medical monitoring device, a meter reading device, and the like. The WUD 120 is configured for communicating using multiple wireless access technologies.

The WUD 120 includes a plurality of network interface modules (NIMs) 122, including an LTE NIM $122_1$ configured for accessing the LTE WAN $112_{W1}$, a CDMA/EVDO NIM $122_2$ configured for accessing the CDMA/EVDO WAN $112_{W2}$, a WiFi NIM $122_3$ configured for accessing the WiFi WAN $122_{W3}$, a Zigbee NIM $122_4$ configured for accessing the Zigbee WAN $112_{W4}$, and a Broadcast NIM $122_5$ configured for accessing the Broadcast WAN $112_{W5}$.

It will be appreciated that NIMs 122 of WUD 120 may be implemented in any suitable manner. In one embodiment, for example, different chip sets may be included within WUD 120 for each of the different access technologies to be supported by WUD 120, thereby enabling the WUD 120 to access the multiple access technologies. In one embodiment, for example, a single chip set supporting multiple access technologies may be included within WUD 120 for enabling the WUD 120 to access the multiple access technologies. It will be appreciated that use LWN 110 by WUD 120 is not intended to be limited by the manner in which access to the access networks is provided at WUD 120.

It will be appreciated that, although primarily depicted and described with respect to specific NIMs 122 supporting specific types of wireless access technologies, fewer or more NIMs 122 may be included within WUD 120 and, similarly, different types of NIMs 122 supporting different wireless access technologies may be included within WUD 120.

It will be appreciated that the numbers and types of NIMs included within a WUD may vary both for the same types of wireless user devices (e.g., depending on the types of NIMs that different manufacturers of wireless user devices choose to include within the wireless user devices, and other similar factors) and for different types of wireless user devices.

It will be appreciated that the level of control by the service provider over the NLs selected for supporting service sessions for a particular WUD will depend on the numbers and types of wireless access technologies supported by the WUD (e.g., a WUD supporting a larger number of wireless access technologies will have more options as to the wireless access networks that can be accessed and, thus, the service provider will have more options as to the network layers which may be selected to service sessions for the WUD).

The WUD 120 includes a network layer selection agent (NLSA) module 124. The NLSA 124 is configured for operating as an interface between each of the NIMs 122 and higher layers on WUD 120, including applications on WUD 120 that will communicate via the NIMs 122 (omitted for purposes of clarity).

The NLSA 124 is configured for selecting which of the NIMs 122 to use for a service session, although the initial NIM 122 selected by NLSA 124 for a service session may be changed by NLSS 140 via selection of a NL that uses a different WAN 112 W than is used by the initial NIM 122 selected by NLSA 124 for the service session.

The NLSA 124 may be configured for selecting between NIMs 122 using known techniques (e.g., selecting to communicate via the WiFi NIM $122_3$ in response to instruction by a user, selecting to communicate via the WiFi NIM $122_3$ when within range of a WiFi wireless access point (WAP), selecting to communicate via LTE NIM $122_1$ when within range of an LTE access point, and the like, as well as combinations thereof).

The NLSA 124 also may be configured for selecting between NIMs 122 based on behavioral information for the WUD 120. The behavioral information for the WUD 120 may be stored on WUD 120, stored on NLSS 140, and the like, as well as combinations thereof.

The NLSA 124 also may be configured for selecting between NIMs 122 under the control of NLSS 140 (e.g., in response to control signals from NLSS 140 that instruct WUD 120 as to which NIM(s) to use for a particular service session(s), using network layer selection information received from NLSS 140, and the like, as well as combinations thereof). In this manner, NLSS 140 is able to control which NL(s) of LWN 110 is used by WUD 120 for a service session(s) established in response to a service request.

The NLSA 124 also may be configured for communicating selected NL information (e.g., information that is indicative of the NL selected for a service session) to the AS 130 associated with the service session for use by the AS 130 to facilitate adaptation of the service to the NL being used for the service session (e.g., for facilitating content adaptation to the NL being used for the service session or performing other similar adaptations which may depend on the type of service being provided).

The NLSA 124 also may be configured for communicating selected NL information (e.g., information that is indicative of the NL selected for a service session) to one or more network elements of the networks 112 of the selected NL but use by the network element(s) to facilitate adaptation of the service to the NL being used for the service session (e.g., to provide content adaptation to the NL being used for the service session or performing other similar adaptations which may depend on the type of service being provided). This may be used in addition to or in place of service adaptation provided by the applications, such as where an application does not support such service adaptation.

In one embodiment, NLSA 124 includes an NLSA API/agent 125 configured for providing functions in support of the layered wireless network capability.

For example, the NLSA API/agent 125 may receive selected NL information (e.g., information that is indicative of the NL selected for a service session) from NLSS 140, for instructing the NLSA 124 of WUD 120 as to which NIM(s) 122 to use for the service session.

For example, the NLSA API/agent 125 may receive network layer selection information (e.g., in the form of network layer selection policies, or in any other suitable format) from NLSS 140, for use by the NLSA 124 of WUD 120 in selecting NLs for service sessions using the network layer selection information.

For example, the NLSA API/agent 125 may provide selected NL information (e.g., information that is indicative of the NL selected for a service session) to the application server associated with the service session for use by the application server to facilitate adaptation of the service to the NL being used for the service session.

The NLSA API/agent 125 may provide other functions for WUD 120 in support of the layered wireless network capability.

The WUD 120 also may include other components, such as one or more of a processor, a memory, a receiver, a transmitter, support modules (e.g., a Universal Integrated Circuit Card (UICC)/Subscriber Identity Module (SIM) for a mobile terminal; a monitoring module for performing some type of monitoring such as meter reading, health monitoring, and the like; and/or any other suitable support modules), power modules, user interfaces (e.g., keyboards, keypads, touch screens, speakers, display screens, and/or any other suitable user interfaces), and the like, as well as combinations thereof, which are omitted for purposes of clarity. It will be appreciated that presence of such components within WUD 120 may depend on the type of WUD 120 (e.g., whether WUD 120 is a computer, a phone, a health monitor, and so forth).

The WUD 120 is configured for utilizing applications hosted on ASs 130 via LWN 110, which provides a set of network layers (NLs) available to support service sessions for WUD 120, including service sessions by which WUD 120 may utilize applications hosted on ASs 130.

The ASs 130 include a plurality of service provider ASs $130_{S1}$-$130_{SN}$ (collectively, service provider ASs $130_S$) and a plurality of third-party ASs $130_{T1}$-$130_{TN}$ (collectively, third-party ASs $130_T$), which may be referred to collectively herein as ASs 130. The service provider ASs $130_S$ include application servers operated by the service provider(s) that is providing the LWN 110. The third-party ASs $130_T$ include application servers operated by application providers other than the service provider.

The ASs 130 support applications which may be utilized by wireless user devices such as WUD 120. The applications include any applications which may be hosted on and accessed via an application server, such as content access applications, email applications, music applications, video applications (e.g., video conferencing, video collaboration, video surveillance, and the like), peer-to-peer applications, gaming applications, participatory media applications, security applications, emergency response applications, pattern recognition applications, M2M applications for a variety of verticals, and the like, as well as combinations thereof.

In one embodiment, each of the ASs 130 may include one or more application APIs/agents 131 (illustratively, application APIs/agents $131_{S1}$-$131_{SN}$ associated with ASs $130_{S1}$-$130_{SN}$ and application APIs/agents $131_{T1}$-$131_{TN}$ associated with ASs $130_{T1}$-$130^{TN}$).

In one embodiment, the application APIs/agents 131 may include layering control APIs/agents. A layering control API/agent of an application enables the application to perform functions associated with network layer control, such as: requesting NL preferences (e.g., by providing network layer preference information to NLSS 140 for use by NLSS 140 in selecting NLs for service sessions for the application); requesting one or more special services (e.g., requests to receive layer-aware feedback, requests for multiple IP connections for the application, and the like); receiving, from the NLSS 140 and/or from WUD 120, network layer capability information associated with the NL(s) being used to provide service sessions for WUD 120; and the like, as well as combinations thereof.

In one embodiment, the application APIs/agents 131 include bearer processing APIs/agents.

For example, a bearer processing API/agent of an application enables the application to perform bearer processing functions. In one embodiment, for example, the bearer processing functions may include identification of applications in order to assess treatment of the applications by NLSS 140 (e.g., selection of NLs used to provide service sessions for the applications). For example, NLSS 140 may easily identify applications that are known to NLSS 140, e.g., applications of the service provider or applications of third-party application providers for which the applications have been registered with the service provider, in any suitable manner (e.g., where each application has an identifier associated therewith and any service request associated with the application includes the associated identifier for use by NLSS 140 in identifying the application, or using any other suitable application identification capabilities). For example, NLSS may not be able to easily identify applications that are unknown to NLSS 140 (e.g., applications of third-party application providers that have not registered with the service provider), in which case the NLSS 140 may need to perform additional processing in order to identify applications that are not known to the service provider (e.g., by identifying an IP address associated with the service request and using the IP address to identify the application, using deep packet inspection (DPI) to identify the application, and the like, as well as combinations thereof).

For example, a bearer processing API/agent of an application may adapt services to the capabilities of the NL being used to provide the service (e.g., adapting content to the capabilities of the NL being used to transport the service or any other similar types of adaptation which may be supported).

For example, a bearer processing API/agent of an application may handle multiple IP interfaces to an access device.

A bearer processing API/agent of an application may perform any other suitable bearer processing functions.

In such embodiments, application APIs/agents 131 may facilitate communications for the ASs 130 in order to support such functions (e.g., communications between ASs 130 and NLSS 140, communications between ASs 130 and WUD 120, communications between ASs 130 and LWN 110, and the like, as well as combinations thereof).

Although depicted and described with respect to an embodiment in which each of the AS 130s includes an application APIs/agent 131, it will be appreciated that in other embodiments only a subset of the ASs 130 will include associated application APIs/agents 131.

The NLSS 140 supports the layered wireless network capability depicted and described herein.

The NLSS 140 select one or more network layers for one or more service sessions in response to a service request for WUD 120.

The NLSS 140 selects the NL(s) for the service session(s) using network layer selection information available to NLSS 140.

The network layer selection information may include one or more of service provider policies, network state information, user preference information, application preference information, and the like, as well as combinations thereof.

The service provider policies specify service provider preferences and/or requirements regarding use of network layers of LWN 110 to support service sessions. The service provider policies may be specified on one or more of a per-application-type basis, a per-application basis, a per-device-type basis, a per-user-profile basis, a per-service-session basis, and the like, as well as combinations thereof. Therefore, selection of network layers for service sessions may be performed on one or more of a per-application-type basis, a per-application basis, a per-device-type basis, a per-user-profile basis, a per-service-session basis, and the like, as well as combinations thereof. In one embodiment, the service provider policies may be the base policies for controlling network layer selection, which may then be modified based on other types of network layer selection information. The service provider policies may be dynamically modified. The service provider policies may be received from any suitable source of such information and, similarly, may be formatted in any manner suitable for maintaining and using such information.

The network state information includes any information indicative of the states of the networks 112 of which the NLs are composed. The network state information for a network 112 may include any information suitable for use in network layer selection. For example, network state information for a network 112 may include congestion information indicative of congestion within the network 112, network capability information indicative of the capabilities of the network to support certain services, and the like, as well as combinations thereof. The network state information of a network 112 may be received from any suitable source of such information (e.g., from one or more network elements of the network 112 (which may depend on the type of network 112 from which the network state information is received), from a management system responsible for providing management functions for the network 112, and the like, as well as combinations thereof). The network state information may be received in any suitable manner, e.g., at any suitable time, in any suitable format, and the like. In one embodiment, NLSS 140 may receive the network state information from network APIs/agents deployed within each of the networks 112 (illustratively, network APIs/agents 113).

The user preference information includes information indicative of preferences of users of WUDs accessing LWN 110. The user preference information may include any user-related information suitable for use in performing network layer selection. For example, user preference information may include user preferences regarding network layers which are used, user preferences regarding the quality of service desired or required by the user, information associated with Service Level Agreements (SLAs) agreed upon by the user and the service provider, and the like, as well as combinations thereof. The user preference information may be specified on one or more of a per-application-type basis, a per-application basis, a per-device basis, a per-service-session basis, and the like, as well as combinations thereof. In one embodiment, user preference information will be accepted for all users, or at least those users that want to provide such information. In one embodiment, user preference information will only be accepted for preferred users which will pay a premium to have greater control over the network layer selection process for their service sessions and, optionally, to have an agreed upon SLA with the service provider. The user preference information for a user may be received from any suitable source of such information (e.g., from a Home Subscriber Server (HSS) and/or other suitable network device, from the user via the WUD, and the like, as well as combinations thereof). The user preference information for a user may be received in any suitable manner, e.g., at any suitable time, in any suitable format, and the like.

The behavioral characteristic information includes information indicative of behavior of users of WUDs and/or the WUDs in accessing LWN 110. The behavioral characteristic information may include any behavioral information suitable for use in performing network layer selection. For example, behavioral characteristic information may include indications of the types of wireless access networks expected to be available to the WUDs (e.g., on certain days of the week, at certain times of day, and the like), types of applications that are expected to be used to access certain services, and the like, as well as combinations thereof. In other words, the behavioral characteristics information may include any information related to the behavior of the users of WUDs and/or the WUDs which may be used to perform network selection. The behavioral characteristic information may be determined in any suitable manner, e.g., using one or more behavior tracking algorithms developed for learning such behavioral characteristics and tracking changes to behavioral characteristics over time. In one embodiment, behavior tracking algorithms may be used to dynamically track user information for users and make inferences based on the user information to form thereby the behavioral characteristic information which may be used to perform network layer selection for the users. For example, behavior tracking algorithms may track the types of wireless networks available to the user at certain times (e.g., certain days of the week, certain times of day, and the like). As an example, behavior tracking algorithms may determine that, on weekdays, between 8:00 AM and 9:00 AM a user only has access to cellular wireless networks (e.g., as the user drives to work), between 9:00 AM and 5:00 PM the user has access to both a WiFi network and cellular networks (e.g., while at work), between 5:00 PM and 6:00 PM a user only has access to cellular wireless networks (e.g., as the user drives back home), and so forth. For example, behavior tracking algorithms may track the applications accessed by the user most frequently and the times at which the applications are most likely to be accessed. It will be appreciated that these are merely a few examples of the types of user information that may be tracked, inferences that may be drawn, and resulting behavioral characteristic information that may be determined using behavior tracking algorithms and, thus, any suitable behavior tracking algorithm(s) may be developed and used for determining any behavioral characteristic information suitable for use in selecting network layers for the user in response to service requests.

In one embodiment, at least a portion of the behavioral characteristic information may be maintained as part of one or more network layer selection policies, which also may include maintaining one or more behavior tracking algorithms as part of one or more network layer selection policies such that the behavior tracking algorithms evolve over time as the tracked behavior evolves. The behavioral characteristic information may be specified on one or more of a per-application-type basis, a per-application basis, a per-device basis, a per-user basis, per-WUD basis and the like, as well as combinations thereof. In one embodiment, behavioral characteristic information will be accepted for all users, or at least those users that want to provide such information. The behavioral characteristic information may be received from any suitable source of such information. For example, the behavioral characteristic information may be received from a network element (e.g., locally from NLSS 140, remotely from a network element such as a Home Subscriber Server (HSS), and/or from any other suitable network element), from the user via the WUD, and the like, as well as combinations thereof. The behavioral characteristic information may be received in any suitable manner, e.g., at any suitable time, in any suitable format, and the like. The behavioral characteristic information associated with a user enables selection of network layers in response to service requests from the user on the basis of any information related to the behavioral characteristic information that is maintained for the user (e.g., based on one or more of the given situation, location, application, and the like, as well as combinations thereof).

The application preference information includes information indicative of preferences of applications providing services to WUDs via LWN 110. The application preference information may include any application-related information suitable for use in performing network layer selection. For example, application preference information may include information indicative of the preferences of applications as to which network layer(s) is used for service sessions for the applications, information associated with business agreements and the manner in which service sessions are provided according based on the business agreements, and the like, as well as combinations thereof. In a case in which an application specifies multiple network layers which may be used for service sessions using the application, application preference information for the application may specify the multiple network layers in priority order. The application preference information may be specified on one or more of a per-device-type basis, a per-user basis, and the like, as well as combinations thereof. The application preference information for an application may be received from any suitable source of such information (e.g., from an application server hosting the application and/or from any other suitable source). The application preference information for an application may be received in any suitable manner, e.g., at any suitable time, in any suitable format, and the like.

The NLSS 140 may process network layer selection information, for use in controlling selection of NLs of LWN 110 in response to service requests from WUD 120, in any suitable manner.

In one embodiment, NLSS 140 may process network layer selection information at the time at which the service request is received from WUD 120. In this embodiment, NLSS 140 may or may not maintain network layer selection policies for controlling selection of NLs in response to service requests from WUD 120 (i.e., NLSS 140 may perform, on-the-fly, the types of processing described herein as being performed for generating and maintaining network layer selection policies at NLSS 140).

In one embodiment, NLSS 140 maintains a set of network layer selection policies which may be used to control selection of NLs in response to service requests from WUD 120. In this embodiment, the NLSS 140 generates and updates the network layer selection policies using network layer selection information available to NLSS 140.

The network layer selection policies may be managed in any suitable manner, i.e., the network layer selection policies may be generated, dynamically modified, and the like, in any suitable manner In one embodiment, the network layer selection policies may be generated and/or modified by combining the network layer selection information to form the network layer selection policies, in any manner suitable to the service provider.

In one embodiment, the network layer selection policies may be generated and/or modified by using the service provider policies as the initial network layer selection policies and then modifying the initial network layer selection policies using other types of network layer selection information (e.g., based on one or more of network state information from a network state information module on NLSS 140, user preference information from user preference information module on NLSS 140, application preference information from an application preference information module on NLSS 140, and bearer selection information from a bearer selection information module on NLSS 140, and the like, as well as various combinations thereof).

It will be appreciated that the network layer selection policies may be generated and/or modified using network layer selection information in any other suitable manner.

The network layer selection policies may be set using any suitable granularity or granularities, which may depend on the granularity at which the network layer selection information is available (e.g., per-application-type, per-application, per-device-type, per-behavioral-characteristics, and the like, as well as combinations thereof).

The network layer selection policies may include any information suitable for use in selecting which of the network layer selection policies to use for a service request (e.g., an indication of a type of application to which the policies apply, an indication of an application to which the policies apply, an indication of a type of device to which the policies apply, an indication of behavioral characteristics to which the policies apply, and the like, as well as combinations thereof).

The network layer selection policies may include any information suitable for use establishing service sessions via the NLs specified in the network layer selection policies. For example, a network layer selection policy may include an indication of the NL(s) of the network layer selection policy, prioritization of the NLs of the network layer selection policy (where the network layer selection policy identifies multiple NLs), quality-of-service levels to be employed, and the like, as well as various combinations thereof.

It will be appreciated that network layer selection policy may include any other suitable information, which may depend on the manner in which the network layer selection policies are implemented, the type of applications with which the network layer selection policies are associated, and the like, as well as combinations thereof.

The network layer selection policies may be specified in any format suitable for enabling NLSS 140 to select one of the network layer selection policies in response to a service request from WUD 120, select one or more of the NLs of LWN 110 based on the network layer selection policy selected in response to a service request from WUD 120, and the like, as well as combinations thereof.

As an example, where network layer selection policies are specified on a per-application-type basis, a network layer selection policy may be maintained for voice applications. In one such example, the network layer selection policy for voice applications may indicate that service sessions for voice applications should be supported as follows: (1) if WiFi WAN $112_{W3}$ is available to the WUD, select the NL including WiFi WAN $112_{W3}$ and Wired CN $112_{C3}$ to transport the service session; (2) if WiFi WAN $112_{W3}$ is not available to the WUD, select the NL including CDMA/EVDO WAN $112_{W2}$ and 3GPP2 Core CN $112_{C2}$ to transport the service session if possible (e.g., if network state information associated with CDMA/EVDO WAN $112_{W2}$ and 3GPP2 Core CN $112_{C2}$ indicates that CDMA/EVDO WAN $112_{W2}$ and 3GPP2 Core CN $112_{C2}$ are not congested); otherwise (3) select the NL including LTE WAN $112_{W1}$ and EPC CN $112_{C1}$ to transport the service session. It will be appreciated that use of such a network layer selection policy will help to ensure that resources of the LTE networks are reserved, whenever possible, for more bandwidth-intensive applications).

As an example, where network layer selection policies are specified on a per-application-type basis, a network layer selection policy may be maintained for email applications. In one such example, the network layer selection policy for voice applications may indicate that service sessions for email applications should be supported as follows: (1) if WiFi WAN $112_{W3}$ is available to the WUD, select the NL including WiFi WAN $112_{W3}$ and Wired CN $112_{C3}$ to transport the service session; (2) if WiFi WAN $112_{W3}$ is not available to the WUD, select the NL including CDMA/EVDO WAN $112_{W2}$ and 3GPP2 Core CN $112_{C2}$ to transport the service session if possible (e.g., if network state information associated with CDMA/EVDO WAN $112_{W2}$ and 3GPP2 Core CN $112_{C2}$ indicates that CDMA/EVDO WAN $112_{W2}$ and 3GPP2 Core CN $112_{C2}$ are not congested); otherwise (3) select the NL including LTE WAN $112_{W1}$ and EPC CN $112_{C1}$ to transport the service session. It will be appreciated that use of such a network layer selection policy will help to ensure that resources of the LTE networks are reserved, whenever possible, for more bandwidth-intensive applications).

As an example, where network layer selection policies are specified on a per-application-type basis, a network layer selection policy may be set and maintained for streaming video applications. In one such example, the network layer selection policy for streaming video applications may indicate that service sessions for streaming video applications should be supported as follows: (1) if possible, select the NL including LTE WAN $112_{W1}$ and EPC CN $112_{C1}$ to transport the service session, otherwise, (2) select the NL including CDMA/EVDO WAN $112_{W2}$ and 3GPP2 Core CN $112_{C2}$ to transport the service session. In this manner, streaming video is transported over the network(s) most capable of supporting streaming video whenever possible, e.g., except when congestion of the LTE networks may result in reduced quality service for the user such that the video should be streamed over a 3G network).

As an example, where network layer selection policies are specified on a per-application-type basis, a network layer selection policy may be set and maintained for heart monitor applications. In one such example, the network layer selection policy for heart monitor applications may indicate that service sessions for heart monitor applications should be supported as follows: (1) if WiFi WAN $112_{W3}$ is available, select the NL including WiFi WAN $112_{W3}$ and Wired CN $112_{C3}$ to transport the service session, and also establish a backup service session on CDMA/EVDO WAN $112_{W2}$ such that the service session may be quickly and seamlessly switched to CDMA/EVDO WAN $112_{W2}$ when WiFi WAN $112_{W3}$ is no longer available to the WUD; otherwise, (2) select the NL including CDMA/EVDO WAN $112_{W2}$ and 3GPP2 Core CN $112_{C2}$ to transport the service session.

As an example, where network layer selection policies are specified on a per-application basis, a network layer selection policy may be set and maintained based on service provider preferences (as as opposed to, or in addition to being based on the preferences of the application). In one such example, the network layer selection policy for a particular streaming video application may indicate that service sessions for that particular streaming video application should be supported as follows: (1) if possible, select the NL including LTE WAN $112_{W1}$ and EPC CN $112_{C1}$ to transport the service session, otherwise, (2) select the NL including CDMA/EVDO WAN $112_{W2}$ and 3GPP2 Core CN $112_{C2}$ to transport the service session. In this manner, since the application is likely to be used by many subscribers, the service provider can ensure that streaming video accessed by many of its subscribers is transported over the network(s) most capable of supporting streaming video whenever possible, e.g., except when congestion of the LTE networks may result in reduced quality of service for the user such that the video should be streamed over a 3G network).

As an example, where network layer selection policies are specified on a per-application basis, a network layer selection policy may be set and maintained based on application preferences (as opposed to, or in addition to being based on the preferences of the service provider). For example, the network layer selection policies may be set as follows. An application may request that its service sessions be supported using only the NL including the WiFi WAN $112_{W3}$ and Wired CN $112_{C3}$. An application may specify that it prefers that its service sessions be supported using the NL including the WiFi WAN $112_{W3}$ and Wired CN $112_{C3}$, then using the NL including the LTE WAN $112_{W1}$ and EPC CN $112_{C1}$, and then using the NL including CDMA/EVDO WAN $112_{W2}$ and 3GPP2 Core CN $112_{C2}$. Other applications may specify other preferences which may be used as the basis for associated network layer selection policies for those other applications.

As an example, where network selection policies are specified on a per-behavioral-characteristics basis, a network layer selection policy may be set and maintained based on behavioral characteristics (as opposed to, or in addition to being based on the preferences of the service provider). For example, a network layer selection policy based on behavior characteristics may be set such that, when a user enters an area in which a WiFi connection is typically available, and the network layer selection policy recognizes that the user traditionally remains in that WiFi area for a sufficiently long period of time to make the conversion to WiFi feasible (e.g., the user is at home, at a library, and the like), then the network layer selection policy will move the user to that WiFi network (e.g., moving the WUD from the NL including CDMA/EVDO WAN $112_{W2}$ and 3GPP2 Core CN $112_{C2}$ to the NL including WiFi WAN $112_{W3}$ and Wired CN $112_{C3}$). As described herein, behavioral characteristics also may be specified for specific applications, locations, and the like, as well as combinations thereof. The behavioral characteristic information associated with a user enables selection of network layers in response to service requests from the user on the basis of any information related to the behavioral characteristic information that is maintained for the user (e.g., based on one or more of the given situation of the user, location of the user, application request by or on behalf of the user, and the like, as well as combinations thereof).

Although specific examples are provided for purposes of clarity in describing types of network layer selection policies which may be used, it will be appreciated that network layer selection policies may be specified in any suitable manner in accordance with the embodiments depicted and described herein.

The NLSS 140 receives a service request for establishment of a service session for WUD 120. The NLSS 140 may receive the service request from WUD 120 and/or from the network (e.g., in the case of a service initiated by the network, such as for push services or other types of services which may be initiated by the network).

The NLSS 140 determines one or more characteristics of the service request.

The characteristic(s) determined for a service request may include any characteristic(s) suitable for use in performing network layer selection for the service request.

In one embodiment, the one or more characteristics of the service request include one or more application-related characteristics of the service request. For example, the one or more application-related characteristics may include an application-type of the service request, an application of the service request, and the like, as well as combinations thereof.

In one embodiment, the one or more characteristics of the service request include one or more user-related characteristics associated with the user with which the service request is associated. For example, the one or more user-related characteristics may include a device-type of the WUD of the user, an indication of a subscription level associated with the user (e.g., such as whether or not the user subscribes to a bronze, silver, or gold level service), a current situation of the user, a current location of the user, and the like, as well as combinations thereof.

In one embodiment, the one or more characteristics of the service request include one or more device-related characteristics of the WUD with which the service request is associated. For example, the one or more device-related characteristics may include a device-type of the WUD with which the service request is associated, a device of the WUD with which the service request is associated (e.g., where a per-user network layer selection policy may be supported), and the like, as well as combinations thereof.

In one embodiment, the one or more characteristics of the service request include one or more SLA-related characteristics associated with an SLA under which the requested service is to be provided. For example, the one or more SLA-related characteristics may include a minimum data rate that must be supported for the requested service, a maximum delay that cannot be exceeded for the requested service, and the like, as well as combinations thereof.

The one or more characteristics of the service request may include any other characteristics suitable for use in performing network layer selection, which may be dependent on the basis upon which network layer selection may be performed.

In one embodiment, while a service request may have multiple characteristics associated therewith, only the characteristic(s) necessary for use in performing network layer selection for the service request may be determined. In one embodiment, for example, in which network layer selection is performed based on an application-type of the service request, the application-type of the service request is determined. In one embodiment, for example, in which network layer selection is performed based on an application of the service request, the application of the service request is determined. In one embodiment, for example, in which network layer selection is performed based on both an application-type and a device-type of the service request, the application-type and the device-type of the service request is determined.

The characteristic(s) of the service request may be determined in any suitable manner, such as from a message or portion of a message that is transporting the service request, by querying one or more devices using information from a message or portion of a message that is transporting the service request, and the like, as well as combinations thereof.

In one embodiment, for example, in which a received service request is associated with an application that is provided by the service provider, NLSS 140 may be able to determine the application-related characteristic(s) of the service request directly from information included within service request.

In one embodiment, for example, in which a received service request is associated with an application that is not provided by the service provider or not known by the service provider (e.g., the application of the service request is an application of a third-party application provider), NLSS 140 may not be able to determine the application-related characteristic(s) of the service request directly from information included within the service request. In one such embodiment, the NLSS 140 may determine the application-related characteristic(s) of the service request by performing additional processing using information included within the service request. For example, NLSS 140 may determine the destination IP address of an application server for which the service request is intended and use the determined destination IP address of the application server to determine the application-related characteristic(s) of the service request. For example, NLSS 140 may use deep packet inspection on the payload of a received packet in order to determine the application-related characteristic(s) of the service request. In such embodiments, the additional processing used to determine the application-related characteristic(s) of the service request may be used to determine the type of the application, to specifically identify the application, and the like, as well as combinations thereof. In such embodiments, the application-related characteristic(s) of the service request may be determined using information available on NLSS 140 (e.g., by querying a local lookup table on NLSS 140) and/or using information obtained by NLSS 140 from one or more remote sources of such information (e.g., by using information extracted from or associated with the service request to query the application server, to query a remote repository of application identification information, and the like, as well as combinations thereof). In such embodiments, processing of information of a service request for determining the application-related characteristic(s) of the service request may be performed by NLSS 140 in any suitable manner.

The NLSS 140 selects one or more NLs of LWN 110 for the service request using the characteristic(s) of the service request and the network layer selection information.

In one embodiment, for example, in which the network layer selection information is maintained as network layer selection profiles and where at least one of the profiles is associated with an application-type, NLSS 140, upon receiving a service request, determines an application-type associated with the service request and selects one of the network layer selection profiles based on the application-type of the service request.

In one embodiment, for example, in which the network layer selection information is maintained as network layer selection profiles and where at least one of the profiles is associated with an application, NLSS 140, upon receiving a service request, determines an application associated with the service request and selects one of the network layer selection profiles based on the application of the service request.

In one embodiment, for example, in which the network layer selection information is maintained as network layer selection profiles and where at least one of the profiles is associated with a device-type, NLSS 140, upon receiving a service request, determines a device-type of the WUD associated with the service request and selects one of the network layer selection profiles based on the device-type of the service request.

In one embodiment, for example, in which the network layer selection information is maintained as network layer selection profiles and where at least one of the profiles is associated with a specific user (e.g., where the network layer selection profile is based on one or more of user preferences, behavioral characteristics, and the like), NLSS 140, upon receiving a service request, determines the user associated with the service request and selects the network layer selection profile associated with that user.

In some such embodiments, the network layer selection policy may already be configured to account for network layer selection information such as network state, user preferences, behavioral characteristics, application preferences, and the like. In this case, selection of the one of the network layer selection policies associated with the application type of the service request results in selection of the NL(s) for the service request without a need to perform additional processing of network layer selection information upon selection of the network layer selection policy (although such additional processing may be performed as necessary or desired, such as where a portion of the network layer selection information is covered by the network layer selection policies and a portion of the network layer selection information is not covered by the network layer selection policies).

In other such embodiments, the network layer selection policy may not already be configured to account for network layer selection information such as network state, user preferences, behavioral characteristics, application preferences, and the like (e.g., the network layer selection policies merely include service provider preference information indicative of the network layers the service provider would like to use to transport traffic from application types). In this case, selection of the one of the network layer selection policies associated with the application type of the service request results in an initial selection of the NL(s) for the service request, however, processing of additional network layer selection information by NLSS 140 may result in modification of the NL(s) ultimately selected for the service request (e.g., such as where service provider preferences regarding the use of network layers are overridden based on network layer selection information such as network state, user preferences, behavioral characteristics, application preferences, and the like, as well as combinations thereof).

As such, although primarily depicted and described herein with respect to embodiments in which the characteristic(s) of a service request is used to select a network layer selection policy for determining a NL(s) for the service request, it will be appreciated that where network layer selection information is not maintained as network layer selection policies, selection of a NL(s) for the service request may be performed by, more generally, processing the network layer selection information for selecting the NL(s) for the service request based on the characteristic(s) of the service request.

The NLSS 140, upon selection of a NL(s) for a service request, initiates signaling for enabling establishment of one or more service sessions using the selected NL(s).

The selection of a single NL for a service session may result in establishment (or at least partial establishment) of a session within LWN 110 using the selected NL of LWN 110.

The selection of multiple NLs for a service session may result in establishment of one or more sessions within LWN 110 using the selected NLs of LWN 110. For example, multiple NLs may be specified in priority order where only a single session is established via one of the NLs at any given time (e.g. a session is initially established via a highest priority NL and, if the session via the highest priority NL is lost or degraded, the session is then migrated to the next highest priority NL, and so forth, so that support for the service session within LWN 110 can adapt dynamically to conditions associated with WUD 120, conditions within LWN 110, and the like, as well as combinations thereof). For example, multiple NLs may be specified in priority order where only a single session is fully established via LWN 110 at any given time, but one or more protection sessions is partially established such that the time required to switch from the active session to a protection session is reduced (e.g., WUD 120 participates in a full session to a first WAN 112 and registers with an access terminal of a second WAN 112 so that the session can be switched to the second WAN 112 when needed or desired). For example, the requested service may require multiple sessions to be active at the same time, in which case the different sessions may be established over different NLs. It will be appreciated that these are just a few examples, and that many other combinations of active and/or partial sessions may be established and utilized to support a service session.

The NLSS 140 initiates signaling for enabling establishment of the service session(s) for the WUD 120. The signaling may include any signaling which may be used for establishing the service session(s) for WUD 120. For example, the signaling may include one or more of: (1) propagating an indication of the selected NL(s) to WUD 120 such that WUD 120 may utilize the correct NIM(s) 122 for the service session(s); (2) propagating information for causing establishment of the service session(s) via the selected NL(s) of LWN 110 (e.g. propagating an indication of the selected NL(s) to networks 122 of the selected NL(s) and/or to one or more management systems associated with the networks 122 of the selected NL(s) for use by such components in determining and applying configuration information for causing establishment of the service session(s) via the selected NL(s), propagating configuration information to networks 122 of the selected NL(s) and/or to one or more management systems associated with the networks 122 of the selected NL(s) for causing establishment of the service session(s) via the selected NL(s), and the like, as well as combinations thereof); (3) propagating an indication of the selected NL(s) to AS(s) 130 participating in the service session(s) such that the AS(s) 130 may communicate over the selected NL(s); (4) and the like, as well as combinations thereof. A more detailed description of such signaling follows.

In one embodiment, NLSS 140 signals an indication of the selected NL(s) to WUD 120 for use by WUD 120 in establishing one or more service sessions on the selected NL(s). In one such embodiment, establishment of the session(s) by WUD 120 may control establishment of the session(s) in LWN 110. In another such embodiment, establishment of the session(s) by WUD 120 will not necessarily control establishment of the sessions in LWN 110 and, thus, NLSS 140 may perform additional signaling to LWN 110 for purposes of enabling the one or more service sessions to be established within LWN 110. The NLSS 140 may signal the indication of the selected NL(s) to WUD 120 in any suitable manner (e.g., via a portion of LWN 110, via a signaling path outside of LWN 110, and the like, as well as combinations thereof). In one embodiment, NLSS 140 signals NLSA 124 of WUD 120 for providing the indication of the selected NL(s) from NLSS 140 to WUD 120 (e.g., such as where signaling is performed from a network layer selection agent on NLSS 140 to the NLSA 124 of WUD 120). The indication of the selected NL(s) may be signaled from NLSS 140 to UD 120 in any other suitable manner.

In one embodiment, NLSS 140 initiates signaling to LWN 110 for causing LWN 110 to establish one or more sessions on the selected NL(s). The NLSS 140 may provide any information suitable for use by LWN 110 in establishing one or more sessions on the selected NL(s), such as (1) an indication that one or more sessions should be established on the NL(s) (from which components of networks 112 may determine and apply configuration information for establishing the session(s)), (2) information adapted for use by components of networks 112 for determining and applying configuration information for establishing the session(s), (3) configuration information to be applied on components within networks 112 for establishing the session(s), and the like, as well as combinations thereof. The NLSS 140 may initiate signaling to any suitable components of LWN 110 and/or associated with LWN 110, e.g., the network elements of the networks 112 to be configured, controllers of the networks 112 to be configured, the network APIs/agents 113 of the networks 112 to be configured, management systems associated with the networks 122 to be configured, and the like, as well as combinations thereof.

In one embodiment, NLSS 140 (and/or WUD 120) signals an indication of the selected NL(s) to the associated AS 130 for use by the AS 130. The AS 130 may use the indication of the selected NL(s) in any suitable manner. For example, the AS 130 may use the indication of the selected NL(s) to support establishment of the service session(s), such as by reserving application resources, initiating an application-layer session, obtaining addresses, and the like. For example, the AS 130 may use the indication of the selected NL(s) to adapt content to the capabilities of the selected NL(s). The NLSS 140 (and/or WUD 120) may signal the indication of the selected NL(s) to WUD 120 in any suitable manner (e.g., via a portion of LWN 110, via a signaling path outside of LWN 110, and the like, as well as combinations thereof).

The NLSS 140 may initiate signaling for enabling reconfiguration of the service session(s) for WUD 120.

The reconfiguration of the service session(s) for WUD 120 may include any suitable types of reconfigurations, such as one or more of moving a service session between NLs, establishing a new service session that is associated with the existing service session, establishing a new service session that replaces the existing service session, and the like, as well as combinations thereof.

The reconfiguration of the service session(s) may be initiated in response to one or more trigger conditions (e.g., such as changes in network layer selection information, trigger conditions detected by monitoring service sessions, and the like, as well as combinations thereof).

The reconfiguration of the service session(s) may be initiated in response to changes in network layer selection information. The changes in network layer selection information may be detected in any suitable manner (e.g., such as where NLSS 140 monitors for changes in one or more of service provider preference information, network state information, and the like, as well as combinations thereof). For example, network state information indicating that there is congestion in the LTE WAN $112_{W1}$ may cause reconfiguration of a service session traversing LTE WAN $112_{W1}$ such that the service session moves from traversing LTE WAN $112_{W1}$ to traversing 3GPP2 Core WAN $112_{W2}$. For example, network selection state information received from an AS 130 associated with a service session using WiFi WAN $112_{W3}$ may indicate that the type of content being transported via the service session is better suited for transmission over LTE WAN $112_{W1}$, thereby causing reconfiguration of the service session such that the service session moves from traversing WiFi WAN $112_{W3}$ to traversing LTE WAN $112_{W1}$.

The reconfiguration of the service session(s) may be initiated in response to trigger conditions detected by monitoring service sessions (e.g., detecting initiation of requests in conjunction with the service session(s), detecting conditions identified by monitoring content conveyed by the service session(s), and the like, as well as combinations thereof).

For example, participants in a conference call, where the user of the WUD 120 is communicating via a NL that includes CDMA/EVDO WAN $112_{W2}$ and 3GPP2 Core WAN $112_{C2}$, may decide to move to a video conference and, thus, may initiate a request for a video conference. In this example, NLSS 140 may detect the request to move to a video conference and, thus, may initiate signaling for causing the service session for WUD 120 to be moved from the NL that includes CDMA/EVDO WAN $112_{W2}$ and 3GPP2 Core WAN $112_{C2}$ to a NL that includes LTE WAN $112_{W1}$ and EPC WAN $112_{C1}$, which is better suited for transport of streaming video required for the video conference.

For example, NLSS 140 may monitor heartbeat information transported via a service session established between WUD 120 (which is configured for monitoring the heart of the user of WUD 120) and one of the ASs 130 (which is configured for receiving and storing the heartbeat information of the user such that it is available for analysis by a doctor). For example, the heartbeat monitoring session may be supporting using a NL that includes Zigbee WAN $112_{W4}$ and Wired CN $112_{C3}$. In this example, in response to detecting an irregular heartbeat of the user based on the monitoring of the heartbeat information, NLSS 140 initiates establishment of a telephone call between the user and his doctor. The NLSS 140 selects one of the NLs for the telephone call (e.g., such as CDMA/EVDO WAN $112_{W2}$ and EPC CN $112_{C1}$) and initiates signaling for establishing the service session via the NL that is selected for the telephone call. In this example, the original heartbeat monitoring session may continue to be maintained.

The trigger conditions may include any other trigger conditions which may cause reconfiguration of a service session.

The NLSS 140 may perform monitoring for the service session(s) for determining whether or not reconfiguration of the service sessions(s) should or must be initiated. The monitoring may be performed in any manner suitable for enabling NLSS 140 to detect conditions which cause reconfiguration of service sessions.

In one embodiment, reconfiguration of a service session includes moving service sessions between NLs. In one embodiment, in which a service session is moved from a first NL to a second NL, NLSS 140 initiates signaling to one or both of the first NL and the second NL, informing the NL(s) that the service session should be moved, and the first NL and second NL may then communicate directly for purposes of moving the service session. In one such embodiment, communication between NLs, for purposes of controlling the movement of a service session between the NLs, is exchanged by the network agents/APIs 113 of the networks 112 of the involved NLs. The movement of a service session between NLs also may include signaling within each of the respective NLs (e.g., between networks APIs/agents 113 of networks 112 and/or networks elements of networks 112 of the first NL for purposes of terminating the session within the first NL and between networks APIs/agents 113 of networks 112 and/or networks elements of networks 112 of the second NL for purposes of establishing the session within the second NL).

In one embodiment, reconfiguration of a service session includes establishing a new service session that is associated with the existing service session. It will be appreciated that establishment of the new service session may be performed as depicted and described with respect to establishing the existing service session.

In one embodiment, reconfiguration of a service session includes establishing a new service session that replaces the existing service session. It will be appreciated that establishment of the new service session may be performed as depicted and described with respect to establishing the existing service session and, similarly, that termination of the existing service session may be performed in any manner suitable for terminating a service session.

As described herein, such signaling associated with establishment and/or reconfiguration of service session(s) may be performed between the various APIs/agents that may implemented within LWN 110, WUD 120, and/or ASs 130.

The NLSS 140 may perform various other functions in support of the layered wireless network capability depicted and described herein.

As depicted in FIG. 1, NLSS 140 communicates with LWN 110. For purposes of clarity, communication between NLSS 140 and LWN 110 is depicted as a communication path 151; however, it will be appreciated that the communication path 151 is representative of any communication which may be supported between NLSS 140 and any of the network elements of LWN 110. The NLSS 140 communicates with LWN 110 for receiving network layer selection information adapted for use in selecting a NL(s) in response to a service request, for providing indications of selected NL(s) to LWN 110, for providing configuration information to LWN 110 (e.g., for use in configuring network elements of a selected NL to support a service session, for causing network elements of a selected NL to determine configuration information for self-configuring to support a service session or configuring other network elements of a selected NL to support a service session, and the like), for providing triggers for initiating reconfiguration of a service session within LWN 110 (e.g., reconfigurations such as moving an existing session between NLs of LWN 110, establishing a new session within LWN 110, and/or any other suitable types of reconfiguration), and the like, as well as combinations thereof. The communication between NLSS 140 and LWN 110 may be provided in any suitable manner, which may depend on factors such as the manner in which NLSS 140 is implemented, whether or not network APIs/agents are implemented within the networks 112 of LWN 110, the type of information being propagated, and the like, as well as combinations thereof. For example, communication between NLSS 140 and LWN 110 may be provided via one or more of at least a portion of LWN 110, other out-of-band signaling outside of LWN 110, and the like, as well as combinations thereof. In one embodiment, communication between NLSS 140 and LWN 110 may be performed between network layer selection information modules implemented on NLSS 140 and network elements of networks 112 of LWN 110 (e.g., with APIs/agents that are deployed on network elements of networks 112 of LWN 110). The communication between NLSS 140 and LWN 110 may be implemented in any other suitable manner.

As depicted in FIG. 1, NLSS 140 communicates with WUD 120. For purposes of clarity, communication between NLSS 140 and WUD 120 is depicted as a communication path 152; however, it will be appreciated that the communication path 152 is representative of any communication which may be supported between NLSS 140 and WUD 120. The NLSS 140 communicates with WUD 120 for receiving service requests from WUD 120, providing indications of selected NL(s) to WUD 120, providing network layer selection information to WUD 120, and the like. The communication between NLSS 140 and WUD 120 may be provided in any suitable manner (e.g., via at least a portion of LWN 110, via other out-of-band signaling outside of LWN 110, and the like, as well as combinations thereof). In one embodiment, communication between NLSS 140 and WUD 120 may be performed between NLSS 140 and NLSA 124 on WUD 120 (e.g., such as where communication between NLSS 140 and WUD 140 is performed between a network layer selection agent on NLSS 140 and the NLSA 124 of WUD 120). The communication between NLSS 140 and WUD 120 may be implemented in any other suitable manner.

As depicted in FIG. 1, NLSS 140 communicates with ASs 130. For purposes of clarity, communication between NLSS 140 and ASs 130 is depicted as a communication path 153; however, it will be appreciated that the communication path 153 is representative of any communication which may be supported between NLSS 140 and ASs 130. The NLSS 140 communicates with the ASs 130 for receiving network layer preference information from the ASs 130, for receiving request for special services from the ASs 130 (e.g., requests to receive layer-aware feedback, requests for multiple IP connections for applications, and the like), for providing network layer capability information to the ASs 130 (e.g., for use by ASs 130 to adapt content to capabilities of the NL over which the content is propagated and the like), and the like, as well as combinations thereof. The communication between NLSS 140 and ASs 130 may be provided in any suitable manner (e.g., via at least a portion of LWN 110, via other out-of-band signaling outside of LWN 110, and the like, as well as combinations thereof). In one embodiment, communication between NLSS 140 and ASs 130 may be performed between NLSS 140 and application APIs/agents that are deployed on ASs 130 (e.g., such as where communication between NLSS 140 and ASs 130 is performed between a network layer selection agent on NLSS 140 and application APIs/agents that are deployed on ASs 130). The communication between NLSS 140 and ASs 130 may be implemented in any other suitable manner.

In FIG. 1, NLSS 140 is depicted as a standalone network element that is located outside of LWN 110 (for purposes of clarity); however, it will be appreciated that NLSS 140 may be deployed either as an existing and/or new platform, that can be hardware and/or software, within LWN 110 in any suitable manner. For example, NLSS 140 may be deployed such that there is physical hardware and/or software layer of the NLSS at the locations at or close to which WUDs access LWN 110 (e.g., at each base station of a cellular access network, at each WiFi WAP of a WiFi access network, and the like). For example, NLSS 140 may be deployed such that there is physical hardware and/or software layer of the NLSS deployed for each wireless access network (e.g., at each radio network controller of a cellular access network supporting X number of base stations, at each central router of a WiFi access network supporting X number of WiFi WAPs, and the like). In embodiments in which NLSS 140 is deployed as multiple physical hardware and/or software elements, each of the NLSSs may communicate in any suitable manner in support of the layered wireless network capability depicted and described herein. In other words, it will be appreciated that the NLSS 140 may be deployed in any manner suitable for enabling NLSS to support the layered wireless network capability depicted and described herein.

The NLSS 140 may be implemented in any manner suitable to enable NLSS 140 to perform the functions of the layered wireless network capability depicted and described herein. An exemplary implementation of NLSS 140 is depicted and described with respect to FIG. 2.

Figure 2:
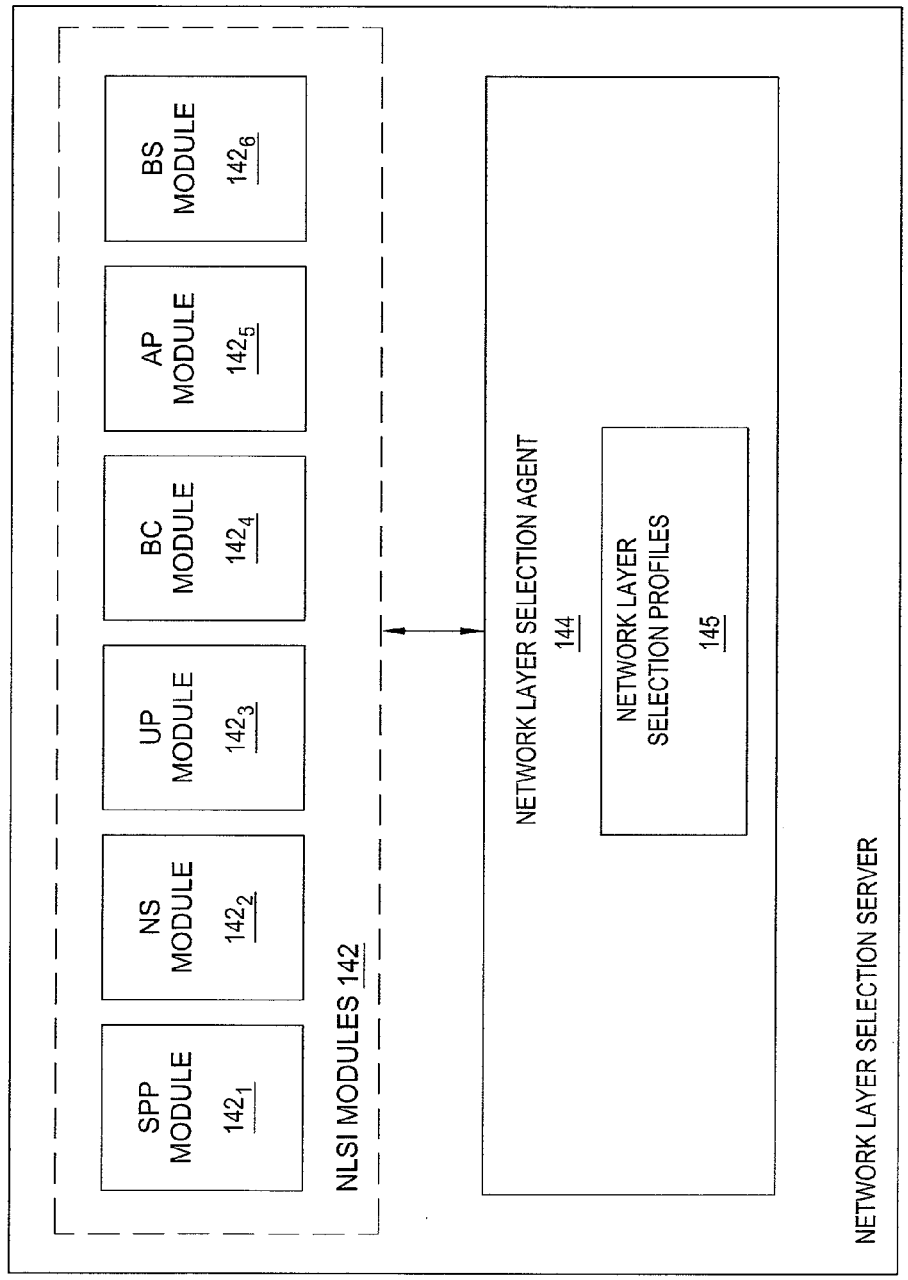
FIG. 2 depicts an exemplary network layer selection server suitable for use as the network layer selection server in the communication system of FIG. 1.

FIG. 2 depicts an exemplary network layer selection server suitable for use as the network layer selection server in the communication system of FIG. 1.

As depicted in FIG. 2, the NLSS 140 includes a plurality of network layer selection information (NLSI) modules 142 configured for receiving and storing network layer selection information and a network layer selection agent (NLSA) 144 configured for performing functions in support of the layered wireless network capability. It will be appreciated that the NLSI modules 142 may be physical modules or logical modules implemented using one or more physical components (i.e., the NLSI modules 142 are primarily depicted and described herein as being separate modules for purposes of clarity is describing the associated functions).

The NLSI modules 142 include a service provider policy (SPP) module $142_1$, a network state (NS) module $142_2$, a user preference (UP) module $142_3$, a behavioral characteristics (BC) module $142_4$, an application preference (AP) module $142_5$, and a bearer select (BS) module $142_6$.

The SPP module $142_1$ receives and stores service provider policies regarding network layer selection. The SPP module $142_1$ may receive and in any suitable manner, e.g., from any suitable source(s) of such information, at any suitable time, and the like.

The NS module $142_2$ receives and stores network state information indicative of the states of networks 112. The NS module $142_2$ may receive and store the network state information in any suitable manner, e.g., from any suitable source(s) of such information, at any suitable time, in any suitable format, and the like. In one embodiment, NS module $142_2$ may receive the network state information from network APIs/agents deployed within the networks 112 (illustratively, network APIs/agents 113).

The UP module $142_3$ receives and stores user preference information indicative of preferences of users of WUDs accessing LWN 110. The UP module $142_3$ may receive and store the user preference information in any suitable manner, e.g., from any suitable source(s) of such information, at any suitable time, in any suitable format, and the like.

The BC module $142_4$ receives and stores behavioral characteristic information indicative of behavioral characteristics of individual user. The BC module $142_4$ may receive the behavioral characteristic information in any suitable manner, e.g., from any suitable source(s) of such information, at any suitable time, in any suitable format, and the like, as well as combinations thereof. The BC module $142_4$ may use behavior tracking algorithms for users to dynamically track user information and make inferences based on that user information to form thereby the behavior characteristic information which may be used in network layer selection for the users. The BC module $142_4$ may track the user information from any suitable sources of such information. The behavioral characteristic information associated with a user enables selection of network layers in response to service requests from the user on the basis of any information related to the behavioral characteristic information that is maintained for the user (e.g., based on one or more of the given situation, location, application, and the like, as well as combinations thereof).

The AP module $142_5$ receives and stores application preference information indicative of preferences of applications (including service provider applications and/or third-party applications) as to which network layer(s) is used for service sessions providing the application. The AP module $142_5$ may receive the application preference information in any suitable manner, e.g., from any suitable source(s) of such information, at any suitable time, in any suitable format, and the like, as well as combinations thereof. In one embodiment, AP module $142_5$ may receive the application preference information from one or more application APIs/agents implemented on ASs 130 (e.g., such as application APIs/agents 131 operating as layering control APIs/agents).

The BS module $142_6$ enables determination of bearers for service sessions for particular applications. In one embodiment, the BS module $142_6$ receives and stores information from applications for use by NLSA 144 in identifying an application of a service request based on information included within the service request (e.g., based on an IP address of the AS 130 that is hosting the application or any other information suitable for use in identifying an application of a service request). In one embodiment, BS module $142_6$ handles requests from NLSA 144 for identification of an application of a service request based on information included within the service request (e.g., where BS module $142_6$ initiates a query to an AS 130 that is hosting the application for obtaining information indicative of the application of the service request. In such embodiments, identification of an application may include identification of application-related characteristics of the application (e.g., identification of the application-type of the application of the service request, identification of the specific application of the service request, and the like). In one embodiment, in which a received service request is associated with an application that is not provided by the service provider or not known by the service provider, such that the NLSS 140 may not be able to determine the application-related characteristic(s) of the service request directly from information included within the service request, processing of information of a service request for determining the application-related characteristic(s) of the service request may be performed by BS module $142_6$ alone or in combination with NLSA 144.

Although depicted and described with respect to specific NLSI modules 142 receiving and storing specific types of network layer selection information, it will be appreciated that the NLSI modules 142 may include fewer or more modules which may receive and store less or more network layer selection information. Although depicted and described with respect to specific functions being performed by NLSI modules 142, it will be appreciated that fewer or more functions associated with providing the layered wireless network capability may be performed by NLSI modules 142.

The NLSA 144 is configured to support control functions described herein as being supported by NLSS 140, such as processing network layer selection information for use in selecting NLs, receiving service requests, selecting NLs in response to service requests based on network layer selection information, initiating signaling for establishing service sessions on selected NLs (e.g., signaling to the LWN 110, the WUD 120 and/or the ASs 130), initiating signaling for reconfiguring service sessions on NLs, and the like, as well as combinations thereof.

The NLSA 144 may maintain network layer selection policies 145 for use in controlling selection of NLs in response to service requests from WUD 120. The NLSA 144 may generate and maintain the network layer selection policies 145 in any suitable manner. The NLSA 144 may generate and maintain network layer selection policies 145 using network layer selection information available to NLSA 144.

As described herein, in response to a service request from WUD 120, NLSS 140 selects one or more NLs of LWN 110 using the network layer selection information, initiates signaling for enabling establishment of one or more service sessions using the selected NL(s) of LWN 110, initiates signaling for enabling reconfiguration of the one or more service sessions using the selected NL(s) of LWN 110, and other functions of the layered wireless network capability. These and other functions supported by NLSS 140 may be better understood by way of reference to FIG. 3.

Figure 3:
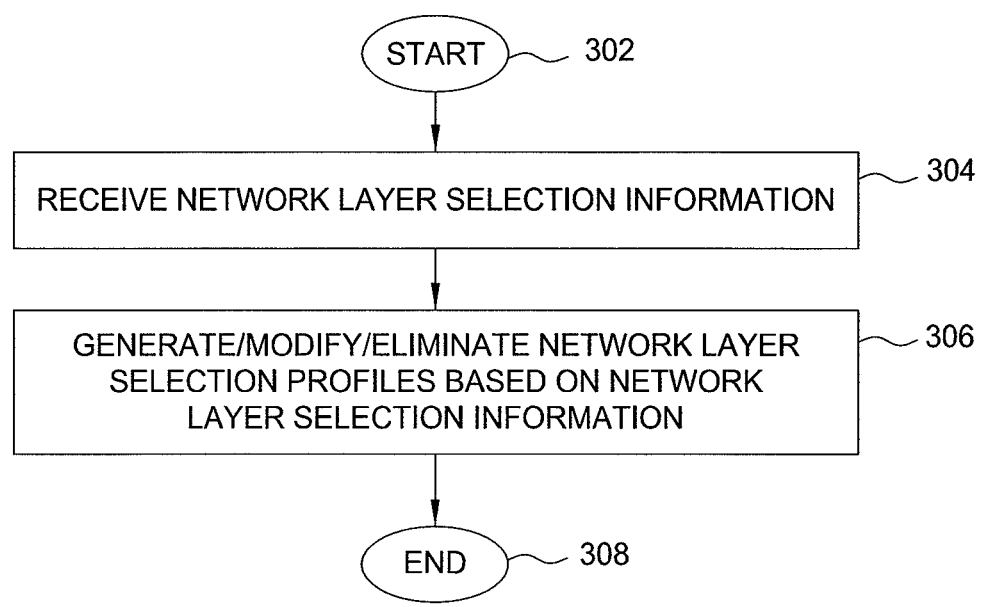
FIG. 3 depicts one embodiment of a method for generating network layer selection policies for use in performing network layer selection in response to service requests.

FIG. 3 depicts one embodiment of a method for generating network layer selection policies for use in performing network layer selection in response to service requests. At step 302, method 300 begins. At step 304, network layer selection information is received. At step 306, network layer selection policies are generated/modified/eliminated using the network layer selection information. At step 308, method 300 ends. In one embodiment, in which network layer selection information is expected to be relatively static (e.g., such as an embodiment where network layer selection is not based on network state information), method 300 may be invoked as needed or desired. In one embodiment, although depicted and described as ending (for purposes of clarity), method 300 may continue to loop through steps 304 and 306 such that the network layer selection policies may be kept current as network layer selection information changes. The operation of method 300 in generating network layer selection policies may be better understood by way of reference to FIG. 1 and FIG. 2.

Figure 4:
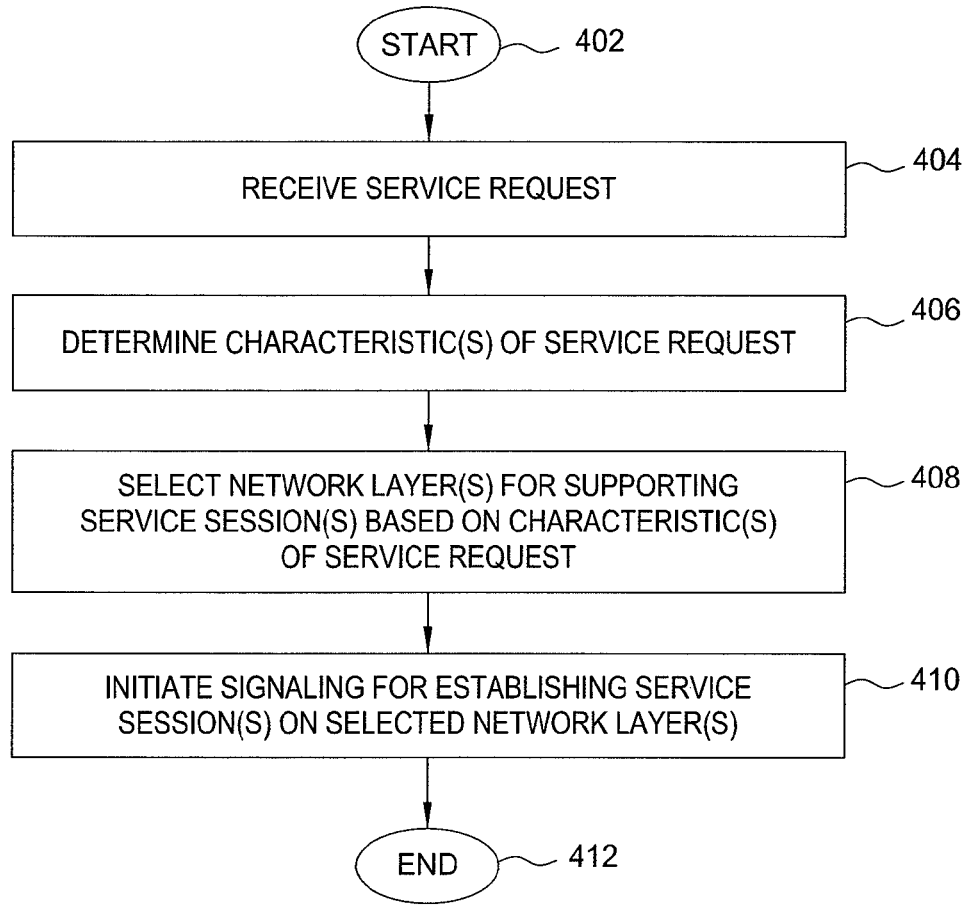
FIG. 4 depicts one embodiment of a method for selecting a network layer for supporting a service session in response to a service request.

FIG. 4 depicts one embodiment of a method for selecting a network layer for supporting a service session in response to a service request.

At step 402, method 400 begins.

At step 404, a service request is received.

In one embodiment, in which network layer selection is performed within the network (e.g., at the NLSS associated with the wireless access point via which the WUD initiates the service request), the service request is received at the NLSS from the WUD or an associated application.

In one embodiment, in which network layer selection is performed at the WUD using network layer selection information received at the WUD from the NLSS, the service request is received at the WUD (e.g., such as where a service request from an application is detected at the WUD).

At step 406, one or more characteristics of the service request are determined. The characteristic(s) of the service request may include one or more application-related characteristics, one or more device-related characteristics, and the like, as well as combinations thereof.

At step 408, a network layer(s) is selected for supporting a service session(s) in response to the service request. As described herein, the network layer(s) is selected using the characteristic(s) of the service request and using network layer selection information.

In one embodiment, in which network layer selection is performed within the network, the network layer(s) is selected using network layer selection information available to the network element that performs the network layer selection (e.g., the NLSS).

In one embodiment, in which network layer selection is performed at the WUD, network layer(s) is selected using network layer selection information received at the WUD from the network (e.g., from the NLSS) prior to receipt of the service request.

At step 410, signaling is initiated for establishing a service session(s) on the selected network layer(s).

In one embodiment, in which network layer selection is performed within the network (e.g., at the NLSS associated with the wireless access point via which the WUD initiates the service request), the signaling may be initiated to one or more of: the WUD associated with the service request, one or more network elements of or associated with networks of the selected network layer(s), and the AS hosting the application associated with the service request.

In one embodiment, in which network layer selection is performed at the WUD using network layer selection information received at the WUD from the NLSS, the signaling may be initiated within the WUD (e.g., such as from NLSA 124 to one or more of the NIMs 122), from the WUD to the LWN (e.g., such as from the WUD to one or more of the WANs $112_W$), and the like, as well as combinations thereof.

At step 412, method 400 ends.

The operation of method 400 in selecting a network layer(s) in response to a service request may be better understood by way of reference to FIG. 1 and FIG. 2.

Figure 5:
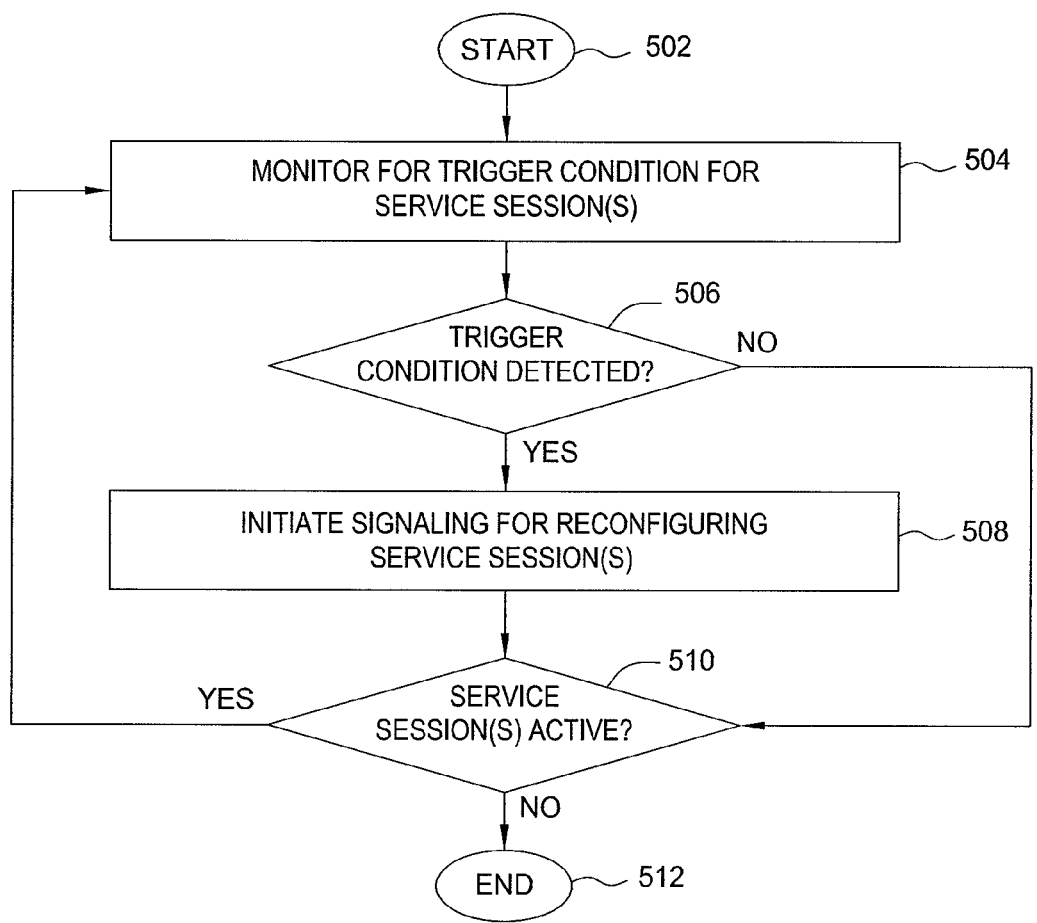
FIG. 5 depicts one embodiment of a method for reconfiguring a service session in response to a trigger condition.

FIG. 5 depicts one embodiment of a method for reconfiguring a service session in response to a trigger condition. In FIG. 5, method 500 is primarily depicted and described with respect to an embodiment in which method 500 is performed by the NLSS.

At step 502, method 500 begins.

At step 504, monitoring is performed for detecting trigger conditions for the service session. The trigger conditions may be any suitable trigger conditions and the monitoring may be performed in any suitable manner.

At step 506, a determination is made as to whether or not a trigger condition is detected. If a trigger condition is detected, method 500 proceeds to step 508. If a trigger condition is not detected, method 500 proceeds to step 510.

At step 508, signaling for reconfiguring the service session is initiated. From step 508, method 500 proceeds to step 510.

At step 510, a determination is made as to whether or not the service session is active. If the service session is active, method 500 returns to step 504 (i.e., although depicted as being performed serially, monitoring for trigger conditions continues to be performed as long as the service session is active). If the service session is not active, method 500 proceeds to step 512.

At step 512, method 500 ends.

As described above, method 500 is primarily depicted and described from the perspective of the NLSS, however, it will be appreciated that the trigger conditions detected at the NLSS in step 502 may be notification signals received at the NLSS from the WUD, e.g., upon detection by the WUD of one or more trigger conditions.

For example, where a first network layer is being used for M2M traffic of a health monitoring device, upon detection by the health monitoring device of an anomaly associated with the health of the user of the health monitoring device, the health monitoring device may send a signal requesting initiation of a video conference call (e.g., such that the user may discuss the potential health problem with his or her doctor). The health monitoring device may initiate the request for the video conference call in any suitable manner. For example, the health monitoring device may initiate a request for an IP address for the video conference call. In this example, the request by the health monitoring device is detected by the NLSS, which then selects a network layer suitable for supporting for the video conference call (e.g., a second network layer that is better suited than the first network for streaming video) and initiates signaling for establishing the video conference call via the selected network layer.

For example, where a first network layer is being used for voice traffic of participants in a conference call, upon detection, by the telephone of one of the participants, of a request by the participant to move to a video conference, the telephone sends a signal requesting initiation of a video conference. The telephone may initiate the request for the video conference in any suitable manner. For example, the telephone may initiate a request for an IP address for the video conference call. In this example, the request by the telephone is detected by the NLSS, which then selects a network layer suitable for supporting for the video conference (e.g., a second network layer that is better suited than the first network for streaming video) and initiates signaling for establishing the video conference call via the selected network layer.

It will be appreciated that many other types of user devices may detect many other types of trigger conditions which cause initiation of associated trigger signals which are then detected by the NLSS and which cause the NLSS to initiate signaling for establishing new service sessions, reconfiguring existing service sessions, and the like, as well as combinations thereof.

It will be appreciated that the operation of method 500 in monitoring for trigger conditions for service sessions and initiating reconfiguration of service sessions in response to detecting trigger conditions may be better understood by way of reference to FIG. 1 and FIG. 2.

The layered wireless network capability may be better understood by way of an example.

FIGS. 6A-6D depict an exemplary use of the layered wireless network of FIG. 1 to maintain wireless connectivity for an e-mail application. As depicted in FIG. 6A-6D, exemplary communication system 600 is essentially the same as exemplary communication system 100 of FIG. 1, with some differences that are described below. In this example, WUD 120 includes an email client 602 and the ASs 130 include an email server 604 (the ASs 130 are omitted for purposes of clarity). In this example, WUD 120 includes a wired NIM 622 connected to wired CN $112_{C3}$. In this example, email client 602 is adapted for receiving and sending emails. In this example, email server 604 includes a layering control API/agent that can work in a high-rate mode or a low-rate mode. In this example, upon receiving a service request from WUD 120 for an email service supported by email client 602 and email server 604, NLSS 140 identifies the network layer selection policy for email applications based on the application type associated with the request for the email service. In this example, assume that the network layer selection policy specifies use the following network access technologies in the following order (from highest priority to lowest priority): wired, WiFi, 3G, and 4G. In other words, in this example the network layer selection policy for email applications specifies use of a wired access network as one of the network access technologies, in addition to multiple wireless access technologies. It will be appreciated that the network layer selection policy may specify use of the 3G-based network layer before use of the 4G-based network layer, despite the higher rates available via the 4G-based network layer, so as to attempt to keep the 4G resource available for carrying types of traffic better suited for transport over a 4G network (e.g., video traffic and the like).

Figure 6A:
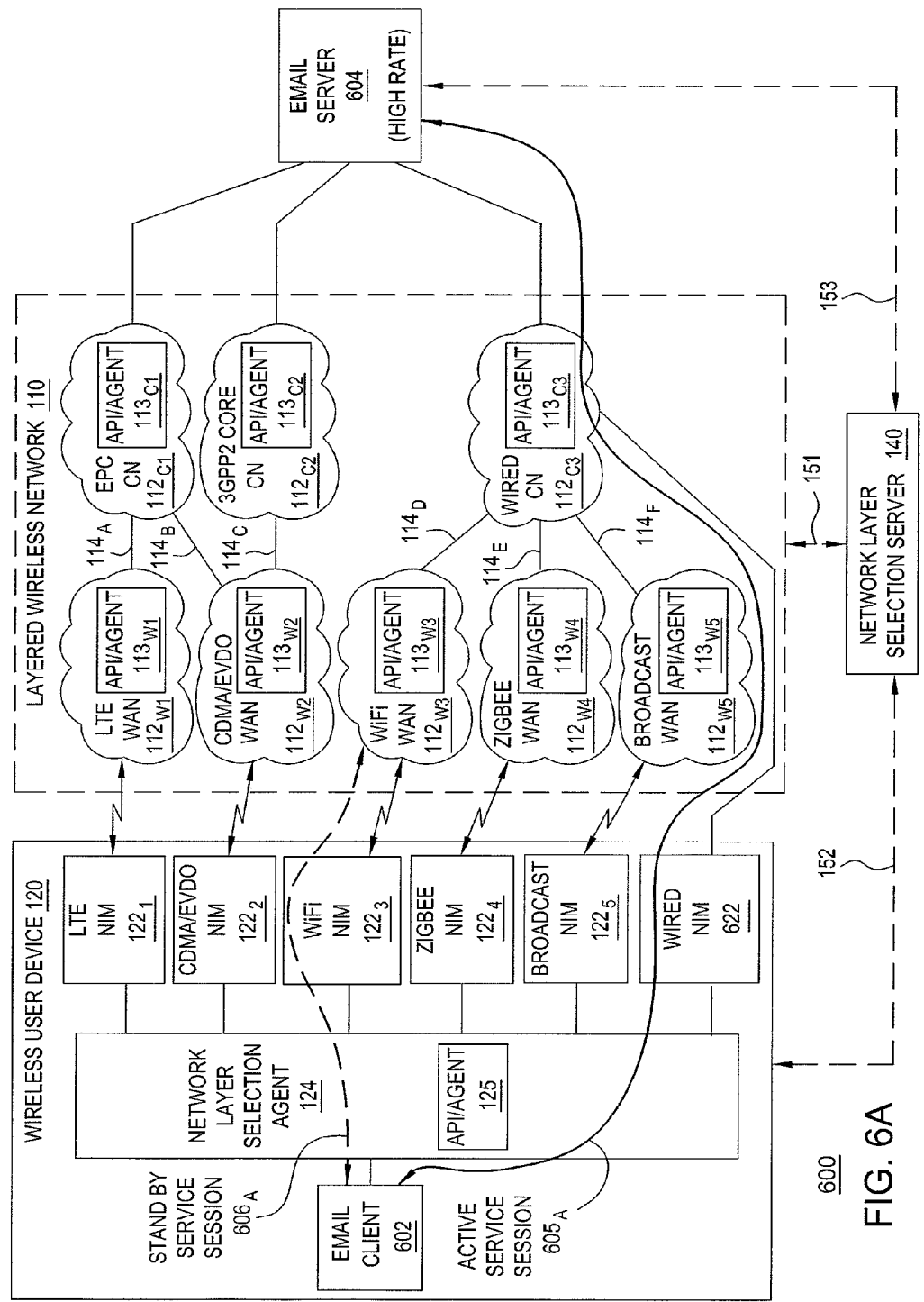
FIGS. 6A-6D depict an exemplary use of the layered wireless network of FIG. 1 to maintain wireless connectivity for an e-mail application.

As depicted in FIG. 6A, in response to a request by the WUD 120 for the email service, an active service session $605_A$ is established between email client 602 on WUD 120 and email server 604 (via wired NIM 622 and wired CN $112_{C3}$) and a standby service session $606_A$ is partially established from email client 602 on WUD 120 to WiFi WAN $112_{W3}$ (for use if needed). The WUD 120 obtains two local IP addresses, i.e., one for wired NIM 622 and wired CN $112_{C3}$ (for use) and one for WiFi NIM $122_3$ and WiFi WAN $112_{W3}$ (for standby, if needed). The layering control API/agent of email server 604 is set to work in a high-rate mode for sending emails to the email client 602 of WUD 120 (based on the connection of WUD 120 via a wired connection).

Figure 6B:
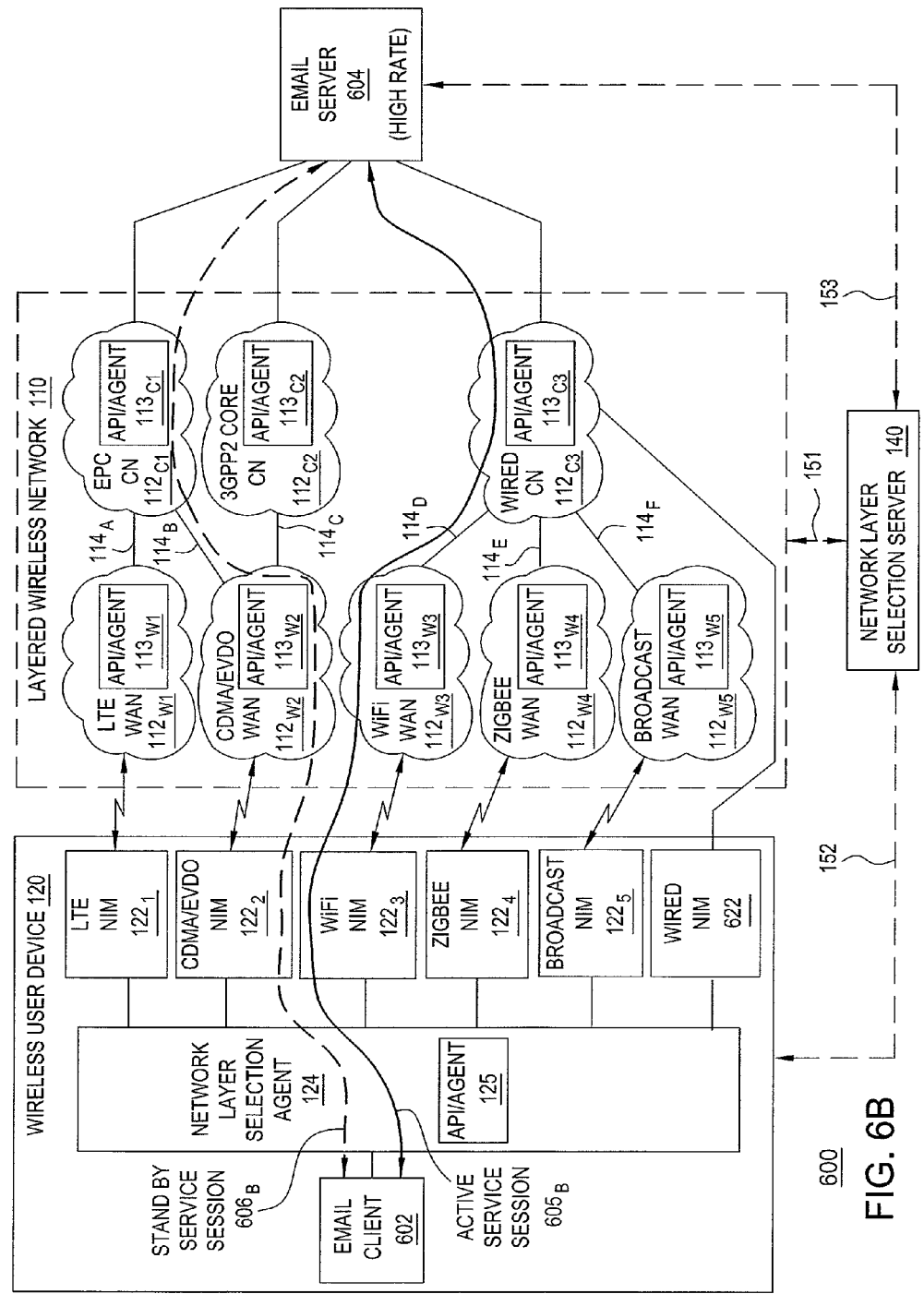

As depicted in FIG. 6B, in response to disconnection of the WUD 120 from using a wired connection, the service session for the email service is switched from using the active service session $605_A$ via the wired connection to using the standby service session $606_A$ via the WiFi-based network layer. In this case, establishment of the standby service session $606_A$ via WiFi is completed such that the WiFi connection becomes the active service session $605_B$ for the email service. The WUD 120 swaps from wired NIM 622 to WiFi NIM $122_3$. The WUD 120 swaps from the active local IP address obtained for wired CN $112_{C3}$ to the standby local IP address obtained for WiFi WAN $112_{W3}$. The wired CN $112_{C3}$ handles the swap using a Network Address Translation (NAT) function (e.g., of a domestic RGW). The layering control API/agent of email server 604 continues to work in the high-rate mode for sending emails to the email client 602 of WUD 120. The WiFi-based network layer is used, even where 3G-based and/or 4G-based network layers are available, because the network layer selection policy specifies use of WiFi before 3G or 4G. In addition, assuming that 3G access is available to WUD 120, a standby service session $606_B$ is established between email client 602 on WUD 120 and email server 604 the 3G-based network layer (e.g., a new mobile domain IP address association is opened and the email client 602 of WUD 120 is authenticated with email server 604, via the 3G-based network layer that traverses CDMA/EVDO NIM $122_2$, CDMA/EVDO WAN $112_{W2}$, and EPC CN $112_{C1}$).

Figure 6C:
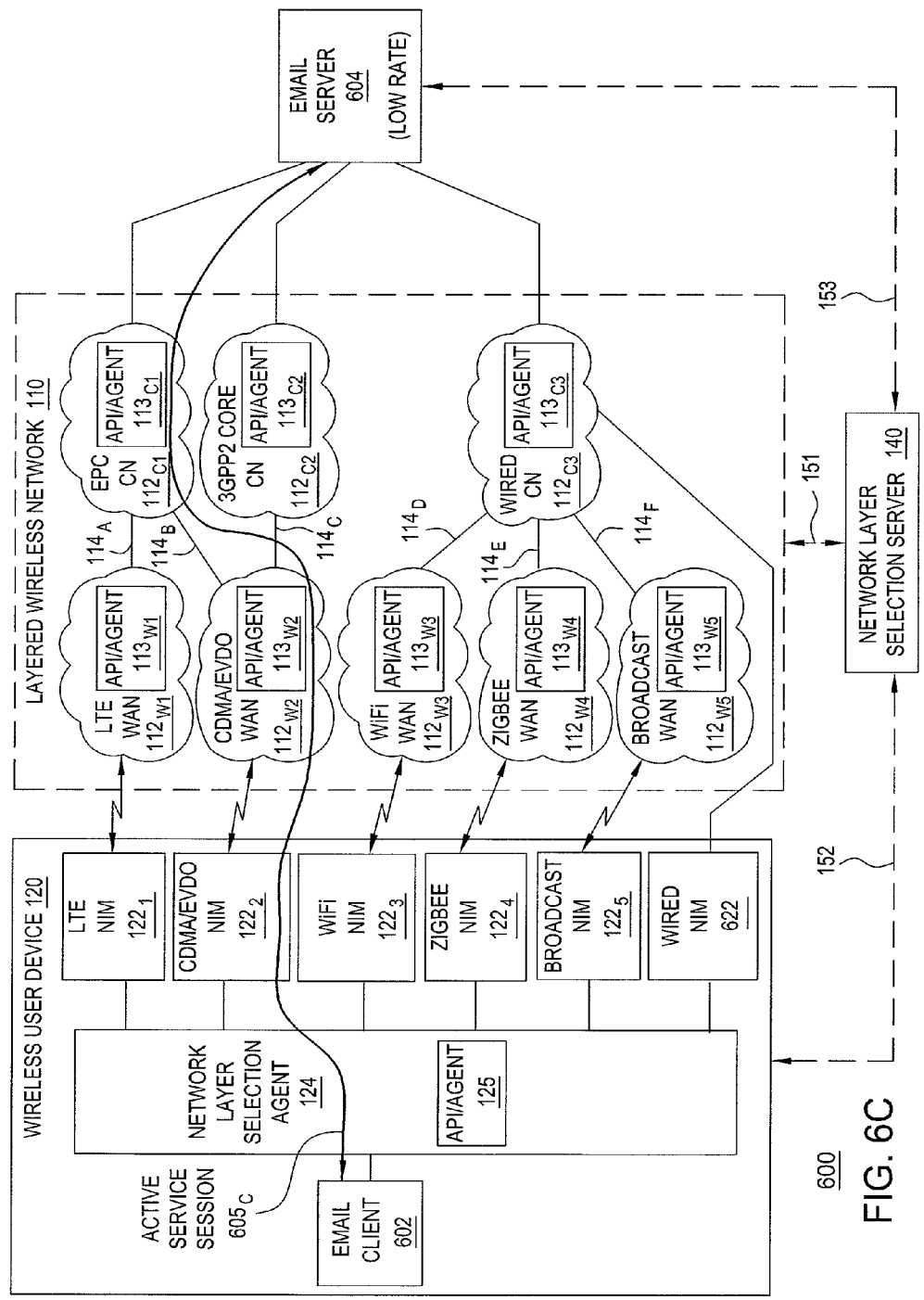

As depicted in FIG. 6C, in response to loss of the WiFi connection by WUD 120 (e.g., the user has left his or her house and is driving to work), the service session for the email service is switched from using the active service session $605_B$ via the WiFi-based network layer to using the standby service session $606_B$ via the 3G-based network layer. In this case, the active service session $605_C$ for the email service uses CDMA/EVDO WAN $112_{W2}$ and EPC CN $112_{C1}$. The WUD 120 swaps from WiFi NIM $122_3$ to CDMA/EVDO NIM $122_2$. The WUD 120 continues to use the local IP address. The email client 602 on WUD 120 reports a change (decrease) in capacity to email server 604 and, in response, the layering control API/agent of email server 604 switches from high-rate mode to low-rate mode for sending emails to the email client 602 of WUD 120. The 3G-based network layer is used, even where the 4G-based network layer is available, because the network layer selection policy specifies use of 3G before 4G.

Figure 6D:
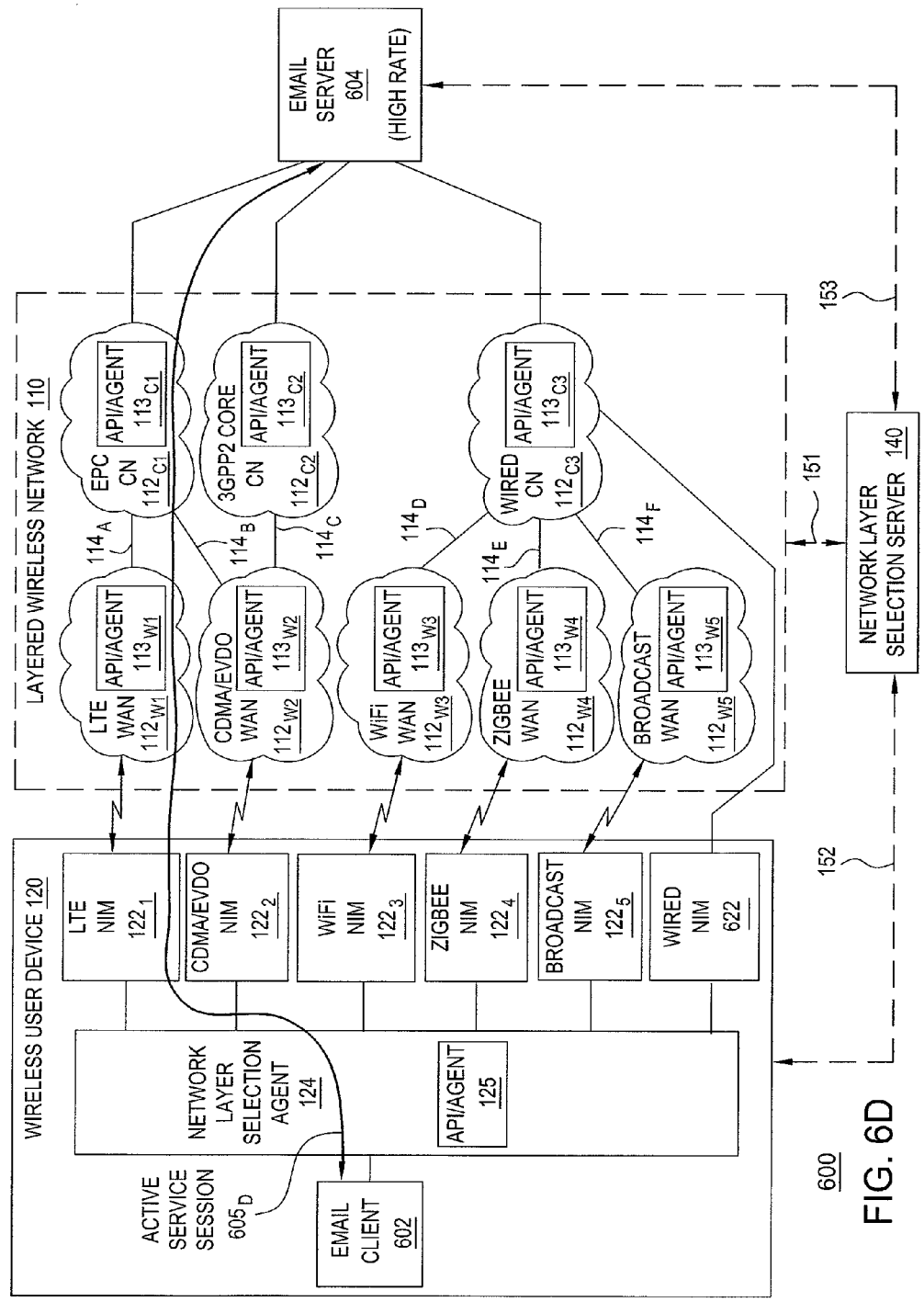

As depicted in FIG. 6D, in response to loss of 3G coverage by WUD 120, the service session for the email service is switched from using the active service session $605_C$ via the 3G-based network layer to using the active service session $605_D$ via the 4G-based network layer. In this case, the active service session $605_D$ for the email service uses LTE WAN $112_{W1}$ and continues to use EPC CN $112_{C1}$. The WUD 120 swaps from CDMA/EVDO NIM $122_2$ to LTE NIM $122_1$. The WUD 120 continues to use the local IP address. The email client 602 on WUD 120 reports a change (increase) in capacity to email server 604 and, in response, the layering control API/agent of email server 604 switches from low-rate mode to high-rate mode for sending emails to the email client 602 of WUD 120. The 3G-based network layer is used, even where the 4G-based network layer is available, because the network layer selection policy specifies use of 3G before 4G.

Although omitted for purposes of clarity, it will be appreciated that the email service session also may transition back to previously used network layers as the network layers become available (e.g., from using the 4G-based network layer to using the 3G-based network layer when WUD 120 regains 3G coverage, from using the 3G-based network layer to using the WiFi-based network layer when WUD 120 regains WiFi coverage, from using the 4G-based network layer to using the WiFi-based network layer when the WUD 120 regains WiFi coverage, and the like).

The layered wireless network capability enables selection between multiple network layers and, thus, multiple network technologies, including both radio access technologies and core technologies, thereby enabling traffic to be transported using technologies best suited for the traffic based on intelligent network layer selection policies, while also taking into account such information as provider preferences, network cost, network congestion, network availability, and the like, as well as combinations thereof. In this manner, the layered wireless network capability enables seamless use of the most optimum network for traffic depending on service provider preferences, network cost, network congestion, network availability, and the like, as well as combinations thereof.

The layered wireless network capability provides many functions, as depicted and described herein. The layered wireless network capability allows invoked applications and network considerations to alter WUD-oriented selection of wireless access, e.g., by informing the WUD of the network layer(s) that it should or must access for particular applications and/or by forcing the WUD to access one or more network layer(s) for particular applications. The layered wireless network capability provides WUD and/or network support for simultaneous bearers on multiple wireless access technologies on a per-application and/or cross-application basis (e.g., where the capability is embedded in the WUD and/or implemented in APIs/agents of the layered wireless network capability). The layered wireless network capability enables applications to become NL-aware, such that content of the applications can be adapted to capabilities of the NL(s) used to transport the content (e.g., embedded within the applications and/or provided within the network using bearer control APIs/agents).

The layered wireless network capability provides costs savings for wireless service providers while at the same time improving the quality of service and quality of experience provided to end users. These benefits are achieved at least one or more of the following: enabling network layer selection (and, thus, access technology selection) based on application needs and transport costs, enabling traffic segmentation into network layers and load balancing between network layers (and, thus, between networks), economically supporting new applications by better managing capacity across network layers (and, thus, across networks), providing content adaptation based on access technology, and the like, as well as combinations thereof.

The layered wireless network capability enables new business models which will bring in new sets of customers to the service provider. For example, the layered wireless network capability supports assigning of an application to a network layer(s) in accordance with the associated value of the application. For example, the layered wireless network capability supports providing highly reliable connections for critical applications (e.g., home security applications, health monitoring applications, and the like) using multiple sessions established over different network layers and, thus, different networks.

The layered wireless network capability provides many other advantages over existing network access schemes.

Figure 7:
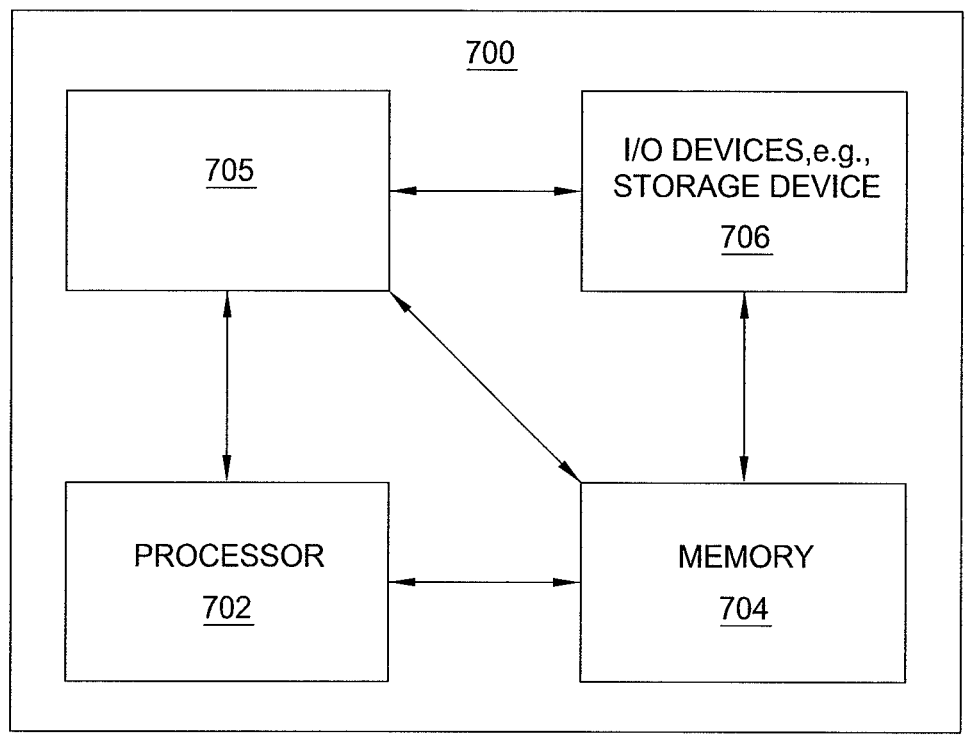
FIG. 7 depicts a high-level block diagram of a computer suitable for use in performing the functions described herein.

FIG. 7 depicts a high-level block diagram of a computer suitable for use in performing the functions described herein. As depicted in FIG. 7, computer 700 includes a processor element 702 (e.g., a central processing unit (CPU) and/or other suitable processor(s)), a memory 704 (e.g., random access memory (RAM), read only memory (ROM), and the like), a network layer control module/process 705, and various input/output devices 706 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, a network layer control process 705 can be loaded into memory 704 and executed by processor 702 to implement the functions as discussed herein above. Thus, network layer control process 705 (including associated data structures) can be stored on a computer readable storage medium, e.g., RAM memory, magnetic or optical drive or diskette, and the like.

It will be appreciated that computer 700 may be suitable for use as any of the network elements and/or any of the portions of the network elements depicted and described herein as performing functions of the layered wireless network capability. For example, computer 700 may be implemented as a server, router, gateway, and the like, as well as combinations thereof. Similarly, it will be appreciated that computer 700 may form a portion of a network element, such as being a portion of a server, router, gateway, and the like, as well as network elements implemented as combinations of servers, routers, gateways, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for supporting a medical monitoring service for a user, the method comprising:
    receiving a request for use of the medical monitoring service;
    selecting, based on a network layer selection policy associated with the medical monitoring service, a first wireless network layer of a plurality of wireless network layers;
    initiating, via the first wireless network layer, establishment of a first service session between a first wireless user device of the user and an application server associated with the medical monitoring service; and
    initiating, based on detection of a medical condition associated with the user via monitoring of content of the first service session, establishment of a second service session via a second wireless network layer of the plurality of wireless network layers, wherein establishment of the second service session is initiated for the first wireless user device of the user or a second wireless user device of the user;
    wherein each of the wireless network layers has a respective wireless access technology associated therewith.

2. The method of claim 1, wherein:
    the medical monitoring service comprises a heart monitoring service.

3. The method of claim 1, wherein, for at least one of the wireless network layers, the wireless access technology comprises one of a Fourth Generation (4G) wireless access technology, a Third Generation (3G) wireless access technology, a Wireless Fidelity (WiFi) wireless access technology network, a ZigBee access technology, or a wireless broadcast access technology.

4. The method of claim 1, wherein the request for use of the medical monitoring service is received by a network element, wherein the network element selects the first and second wireless network layers using network layer selection information.

5. The method of claim 1, wherein the request for use of the medical monitoring service is received at the first wireless user device from an application available on the first wireless user device, wherein the first wireless user device selects the first wireless network layer based on the network layer selection policy.

6. The method of claim 1, wherein, for at least one of the wireless network layers, the wireless network layer comprises a wireless access network and a core network.

7. The method of claim 1, wherein the first wireless network layer comprises a first wireless access network and the second wireless network layer comprises a second wireless access network.

8. The method of claim 1, wherein the second service session is configured for medical monitoring for the user.

9. The method of claim 1, wherein the second service session is configured for at least one of audio communications related to the medical monitoring for the user in the first service session or video communications related to the medical monitoring for the user in the first service session.

10. The method of claim 1, wherein establishment of the second service session is based on at least one of an application-related characteristic of the request for use of the medical monitoring service, a user-related characteristic of the request for use of the medical monitoring service, or a Service Level Agreement (SLA)-related characteristic of the first wireless user device or the second wireless user device.

11. The method of claim 1, further comprising:
    selecting the second wireless network layer for the second service session based on information associated with the medical monitoring service.

12. The method of claim 1, further comprising:
    selecting the second wireless network layer for the second service session based on network layer selection information.

13. The method of claim 12, wherein the network layer selection information comprises a policy indicative that the the second wireless network layer is to be selected for the second service session.

14. The method of claim 12, wherein the network layer selection information comprises at least one of service provider preferences, network status information, user preferences, behavioral characteristics, or application preferences.

15. The method of claim 12, wherein the network layer selection information comprises a plurality of network layer selection policies, wherein selecting the second wireless network layer comprises:
    accessing one of the network layer selection policies based on at least one characteristic of the request for use of the medical monitoring service; and
    selecting the second wireless network layer based on the accessed network layer selection policy.

16. The method of claim 15, wherein the accessed network layer selection policy identifies at least two of the wireless network layers.

17. The method of claim 16, wherein the at least two of the wireless network layers are prioritized.

18. The method of claim 1, further comprising:
  detecting a trigger condition associated with at least one of the first service session or the second service session; and
  propagating at least one reconfiguration message toward at least one of the first wireless network layer or the second wireless network layer.

19. An apparatus for supporting a service for a user, the apparatus comprising:
  a processor and a memory communicatively connected to the processor, the processor configured to:
    receive a request for use of the medical monitoring service;
    select, based on a network layer selection policy associated with the medical monitoring service, a first wireless network layer of a plurality of wireless network layers;
    initiate, via the first wireless network layer, establishment of a first service session between a first wireless user device of the user and an application server associated with the medical monitoring service; and
    initiate, based on detection of a medical condition associated with the user via monitoring of content of the first service session, establishment of a second service session via a second wireless network layer of the plurality of wireless network layers, wherein establishment of the second service session is initiated for the first wireless user device of the user or a second wireless user device of the user;
  wherein each of the wireless network layers has a respective wireless access technology associated therewith.

20. A non-transitory computer-readable storage medium storing instructions which, when executed by a processor, cause the processor to perform a method for supporting a service for a user, the method comprising:
  receiving a request for use of the medical monitoring service;
  selecting, based on a network layer selection policy associated with the medical monitoring service, a first wireless network layer of a plurality of wireless network layers;
  initiating, via the first wireless network layer, establishment of a first service session between a first wireless user device of the user and an application server associated with the medical monitoring service; and
  initiating, based on detection of a medical condition associated with the user via monitoring of content of the first service session, establishment of a second service session via a second wireless network layer of the plurality of wireless network layers, wherein establishment of the second service session is initiated for the first wireless user device of the user or a second wireless user device of the user;
  wherein each of the wireless network layers has a respective wireless access technology associated therewith.

* * * * *